(12) United States Patent
Hiser et al.

(10) Patent No.: US 10,193,927 B2
(45) Date of Patent: Jan. 29, 2019

(54) METHOD OF INSTRUCTION LOCATION RANDOMIZATION (ILR) AND RELATED SYSTEM

(71) Applicants: Jason D. Hiser, Charlottesville, VA (US); Anh Nguyen-Tuong, Charlottesville, VA (US); Michele Co, Charlottesville, VA (US); Jack W. Davidson, Charlottesville, VA (US)

(72) Inventors: Jason D. Hiser, Charlottesville, VA (US); Anh Nguyen-Tuong, Charlottesville, VA (US); Michele Co, Charlottesville, VA (US); Jack W. Davidson, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 14/381,464

(22) PCT Filed: Feb. 27, 2013

(86) PCT No.: PCT/US2013/027944
§ 371 (c)(1),
(2) Date: Aug. 27, 2014

(87) PCT Pub. No.: WO2013/130548
PCT Pub. Date: Sep. 6, 2013

(65) Prior Publication Data
US 2015/0106872 A1 Apr. 16, 2015

Related U.S. Application Data

(60) Provisional application No. 61/603,880, filed on Feb. 27, 2012.

(51) Int. Cl.
*G06F 17/00* (2006.01)
*H04L 29/06* (2006.01)
*G06F 21/56* (2013.01)

(52) U.S. Cl.
CPC .............. *H04L 63/20* (2013.01); *G06F 21/56* (2013.01); *H04L 63/14* (2013.01); *H04L 63/1466* (2013.01)

(58) Field of Classification Search
CPC ...................................................... H04L 29/06
(Continued)

(56) References Cited

U.S. PATENT DOCUMENTS 3,771,141 A * 11/1973 Culler ................... G06F 9/3889
711/109
5,133,061 A 7/1992 Melton
(Continued)

FOREIGN PATENT DOCUMENTS

WO WO 2007/008919 1/2007
WO Wo 2009/108245 9/2009

OTHER PUBLICATIONS

Micheal J. Wirthlin; DISC: The dynamic instruction set computer; Citeseer; Year: 1993; p. 1-12.*
(Continued)

*Primary Examiner* — Monjour Rahim
(74) *Attorney, Agent, or Firm* — Robert J. Decker

(57) ABSTRACT

Systems and methods for relocating executable instructions to arbitrary locations are described, in which the relocation of the instructions may be arbitrary or random, and may operate on groups of instructions or individual instructions. Such relocation may be achieved through hardware or software, and may use a virtual machine, software dynamic translators, interpreters, or emulators. Instruction relocation may use or produce a specification governing how to relo-
(Continued)

cate the desired instructions. Randomizing the location of instructions provides defenses against a variety of security attacks. Such systems and methods may provide many advantages over other instruction relocation techniques, such as low runtime overhead, no required user interaction, applicability post-deployment, and the ability to operate on arbitrary executable programs.

30 Claims, 19 Drawing Sheets

(58) Field of Classification Search
USPC .............................................................. 726/1
See application file for complete search history.

(56) References Cited

U.S. PATENT DOCUMENTS

| | | | |
|---|---|---|---|
| 5,276,826 A | 1/1994 | Rau | |
| 5,897,662 A | 4/1999 | Corrigan | |
| 5,950,007 A * | 9/1999 | Nishiyama | G06F 8/4442 |
| | | | 717/146 |
| 6,205,580 B1 * | 3/2001 | Hirose | G06F 9/445 |
| | | | 711/202 |
| 6,591,414 B2 * | 7/2003 | Hibi | G06F 8/52 |
| | | | 717/151 |
| 6,684,394 B1 * | 1/2004 | Shann | G06F 8/54 |
| | | | 717/162 |
| 7,430,670 B1 | 9/2008 | Horning | |
| 7,444,648 B2 | 10/2008 | Bracha | |
| 7,546,430 B1 | 6/2009 | Miller | |
| 7,779,216 B2 | 8/2010 | Souders | |
| 7,802,232 B2 | 9/2010 | Zorn | |
| 7,831,791 B2 | 11/2010 | Miller | |
| 7,870,396 B2 * | 1/2011 | Kamei | G06F 21/125 |
| | | | 713/153 |
| 8,171,256 B1 | 5/2012 | Satish | |
| 8,195,957 B2 | 6/2012 | Dolgunov | |
| 8,234,638 B2 * | 7/2012 | Bird | G06F 21/54 |
| | | | 717/127 |
| 2004/0133777 A1 * | 7/2004 | Kiriansky | G06F 21/554 |
| | | | 713/166 |
| 2008/0016314 A1 | 1/2008 | Li | |
| 2008/0040607 A1 | 2/2008 | Kaabouch | |
| 2008/0256073 A1 | 10/2008 | Detlefs | |
| 2009/0144561 A1 | 6/2009 | Davidson | |
| 2010/0174876 A1 * | 7/2010 | Kasahara | G06F 8/453 |
| | | | 711/154 |
| 2010/0306746 A1 | 12/2010 | Barua | |
| 2011/0035601 A1 * | 2/2011 | Davidson | G06F 21/14 |
| | | | 713/190 |
| 2011/0145472 A1 | 6/2011 | Whitehouse | |
| 2011/0191848 A1 | 8/2011 | Zorn | |
| 2011/0283115 A1 * | 11/2011 | Junod | G06F 21/14 |
| | | | 713/190 |
| 2012/0185700 A1 * | 7/2012 | Vidrine | G06F 21/52 |
| | | | 713/189 |
| 2013/0086550 A1 * | 4/2013 | Epstein | G06F 12/1475 |
| | | | 717/110 |

OTHER PUBLICATIONS

Hovav; On the Effectiveness of Address-Space Randomization; ACM; Oct. 25-29, 2004; p. 298-307.*
Hiser et al., "ILR: Where'd My Gadgets Go?", IEEE Symposium on Security and Privacy, 2012, pp. 571-585, Published by IEEE Publications, New Jersey, United States.
Pappas et al., "Smashing Gadgets: Hindering Return-Oriented Programming Using In-Place Code Randomization", IEEE Symposium on Security and Privacy, 2012, pp. 601-615, Published by IEEE Publications, New Jersey, United States.
Wartell et al., "Binary Stifling: Self-randomizing instruction Addresses of Legacy x86 Binary Code", Conference Paper, Proceedings of the ACM Conference on Computer and Communications Security, Oct. 2012, 12 pages, Published by ACM/SIGSAC, United States.

* cited by examiner

METHOD OF INSTRUCTION LOCATION RANDOMIZATION (ILR) AND RELATED SYSTEM

RELATED APPLICATIONS

The present application is a national stage filing of International Application No. PCT/US2013/027944, filed Feb. 27, 2013, which claims priority under 35 U.S.C. § 119(e) from U.S. Provisional Application Ser. No. 61/603,880 filed Feb. 27, 2012, entitled "Method of Fine-Grained Instruction Location Randomization (ILR) and Related System;" the disclosures of which are hereby incorporated by reference herein in their entirety.

STATEMENT OF GOVERNMENT INTEREST

This invention was made with Government Support under Grant No. FA8650-10-C-7025 awarded by the Air Force. The government has certain rights in the invention.

FIELD OF THE INVENTION

The present invention relates generally to the field of instruction location randomization intended for randomizing the location of instructions for a variety of applications.

BACKGROUND OF INVENTION

Computer software controls many major aspects of modern life, including air travel, power distribution, banking, medical treatment, traffic control, and a myriad of other essential infrastructures. Unfortunately, weaknesses in software code (such as memory corruption, fixed-width integer computation errors, input validation oversights, and format string vulnerabilities) remain common. Via these weaknesses, attackers are able to hijack an application's intended control flow to violate security policies by exfiltrating secret data, allowing remote access, bypassing authentication, eliminating services, or other techniques.

Unfortunately, modern deployed defenses fail to thoroughly mitigate these threats, even when composed. Some techniques may randomize the addresses to a limited extent used in a program, but unfortunately only some addresses are randomized in modern implementations, and only randomize the base address of loaded functions or modules, not each address within the module. Thus, prior techniques are vulnerable to information-leakage and entropy-exhausting attacks. Other techniques delineate code from data to prevent code-injection attacks. However, arc-injection attacks and various forms of return-oriented programming (ROP) attacks bypass those defensive techniques by reusing code already embedded in the program. Additionally, methods that attempt to effectively address these weaknesses require computational overhead that makes their computational cost prohibitive.

The present invention meets these needs of the many industries that rely on the security of their software, including but not limited to essential infrastructures for government, commerce, and even personal computing.

SUMMARY OF EXEMPLARY EMBODIMENTS OF THE INVENTION

New methods, systems, and computer readable media for computer security have been successfully developed. An embodiment of the present invention demonstrates the creation of a specification, which defines how to relocate blocks of instructions to arbitrary locations. The blocks of instructions may be of an arbitrarily-selectable size. The size of the blocks of instructions may be selected by a human, a computer algorithm, and/or through random selection. Blocks of instructions may be scanned to identify those instructions that should not be relocated, as well as indirect and direct branch targets. The blocks of instructions may be part or entirely a set of instructions. The set of instructions may be part or entirely one or more files, and may include each instruction in that file or files. The specification may be produced by a processor, compiler, assembler, linker, or loader, among other tools. The specification may define how to add, modify, and/or remove blocks of instructions. The specification may also define the execution successors of each instruction in said blocks of instructions. The specification may further define rules for relocating indirect branch targets. The exception handling tables may be rewritten to contain the locations of the potential indirect branch targets that have been relocated. The specification may also contain rules for modifying call instructions such that relocated return addresses are stored. The specification may define how to transform one or more files containing the instructions to be relocated so that the files contain include the relocation of the blocks of instructions to arbitrary locations in memory. The specification may further define in a second specification how to add, modify, and/or remove blocks of instructions. One or more files may be encoded with the specification. The specification may be sent to an output device such as storage, memory, network, or display devices.

An embodiment of the present invention method, system, and computer readable medium demonstrates the relocation of blocks of instructions to arbitrary locations, the blocks of instructions being of an arbitrarily-selectable size. The relocation may occur according to a specification that defines how to perform the relocation. The relocated blocks of instructions may be re-relocated at any time. The re-relocation may include only a portion of the blocks of instructions. The blocks of instructions may be processed by a virtual machine, which may be a per-process virtual machine or a system-level virtual machine, and may prevent revealing the locations of the relocated blocks of instructions. The arbitrary locations may be randomized. The blocks of instructions may be processed by an execution-time compiler, optimizer, simulator, emulator, binary rewriter, processing unit, and/or hardware, and may be processed in parallel.

In another embodiment, each instruction in one or more sets of instructions may be located and a specification may be created defining how to relocate each instruction. The location of the individual instructions may be accomplished by iterating through the contents in each set of instructions. After each of the individual instructions are located, they may be inserted into a database. The specification may define how to relocate each of the instructions found to be a direct branch target or potential indirect branch target, and the embodiment may include the relocation of those instructions according to the definition in the specification. Similarly, this embodiment may also include identification of function calls in the instructions. The specification may also include a definition of how to store relocated return addresses for each function call. Those function call return addresses may be stored as defined in the specification.

In another embodiment, every instruction in one or more sets of instructions may be relocated to arbitrary locations. These arbitrary locations may be randomized. The relocation may occur pursuant to a specification defining how to relocate every instruction in a set or sets of instructions. To execute the instructions, the instructions may be processed by a virtual machine, interpreter, execution-time compiler or optimizer, simulator, emulator, binary rewriter, processing unit, or hardware. The instructions may be processed in parallel. In certain embodiments, the virtual machine processing the instructions may be a per-process or system-level virtual machine, among others. The virtual machine may prevent revealing the new, relocated locations of each processed instruction.

Another embodiment may combine the functionality of various aspects of above embodiments. For example, one embodiment may provide for defining in a specification how to relocate each instruction in one or more sets of instructions and relocating the instructions to arbitrary locations pursuant to that specification.

It should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user or users (e.g., customer or vendor, clinician, patient or machine/system/computer/processor), as well as any intermediate user or users as desired or required. Moreover, the various components may be in communication via wireless and/or hardwire or other desirable and available communication means, systems, and/or hardware. Moreover, various components and modules may be substituted with other modules or components that provide similar functions.

It should be appreciated that any of the components or modules referred to with regards to any of the present invention embodiments discussed herein, may be transmitted to the appropriate or desired computer networks in various locations and sites (local and/or remote) via the desired or required communication links.

It should be appreciated that any of the components or modules referred to with regards to any of the present invention embodiments discussed herein, may be integrally contained within one or more housings or separated and/or duplicated in different housings. Similarly, it should be appreciated that any of the components or modules referred to with regards to any of the present invention embodiments discussed herein, may be duplicated more than once. Moreover, various components and modules may be adapted to replace another component or module to perform the intended function.

It should be appreciated that any of the components or modules referred to with regards to any of the present invention embodiments discussed herein, may be in direct or indirect communication with any of the other components/modules.

An aspect of an embodiment of the present invention provides a method of computer security. The method may comprise: defining in a specification how to relocate blocks of instructions to arbitrary locations, the blocks of instructions being of an arbitrarily-selectable size; and providing the specification to an output device.

An aspect of an embodiment of the present invention provides a method of computer security. The method may comprise: relocating blocks of instructions to arbitrary locations, the blocks of instructions being of an arbitrarily-selectable size.

An aspect of an embodiment of the present invention provides a method of computer security. The method may comprise: defining in a specification how to relocate blocks of instructions to arbitrary locations, the blocks of instructions being of an arbitrarily-selectable size; and relocating blocks of instructions according to the specification.

An aspect of an embodiment of the present invention provides a method of computer security. The method may comprise: locating each instruction in one or more sets of instructions; defining in a specification how to relocate each of the instructions to arbitrary locations; and providing the specification to an output device.

An aspect of an embodiment of the present invention provides a method of computer security. The method may comprise: relocating each instruction in one or more files to arbitrary locations.

An aspect of an embodiment of the present invention provides a method of computer security. The method may comprise: defining in a specification how to relocate each instruction in one or more sets of instructions to arbitrary locations; and relocating the instructions to arbitrary locations according to the specification.

An aspect of an embodiment of the present invention provides a system for computer security. The system may comprise: an input module to receive blocks of instructions, the blocks of instructions being of an arbitrarily-selectable size; a processor configured to define in a specification how to relocate the blocks of instructions to arbitrary locations; and an output module configured to transmit the specification.

An aspect of an embodiment of the present invention provides a system for computer security. The system may comprise: an input module to receive blocks of instructions, the blocks of instructions being of an arbitrarily-selectable size; a processor configured to relocate the blocks of instructions to arbitrary locations; and an output module configured to send the blocks of instructions.

An aspect of an embodiment of the present invention provides a system for computer security. The system may comprise: an input module to receive blocks of instructions, the blocks of instructions being of an arbitrarily-selectable size; a processor configured to a) define in a specification how to relocate the blocks of instructions to arbitrary locations, and b) relocate the blocks of instructions according to the specification; and an output module to send the blocks of instructions to the arbitrary locations.

An aspect of an embodiment of the present invention provides a system for computer security. The system may comprise: an input module to receive one or more sets of instructions; a processor configured to a) locate each instruction in one or more sets of instructions, and b) define in a specification how to relocate each of the instructions to arbitrary locations; and an output module to transmit the specification.

An aspect of an embodiment of the present invention provides a system for computer security. The system may comprise: an input module to receive the one or more files; a processor configured to relocate each instruction in the one or more files to arbitrary locations; and an output module to send the instructions to the arbitrary locations.

An aspect of an embodiment of the present invention provides a system for computer security. The system comprising: an input module to receive one or more sets of instructions; a processor configured to a) define in a specification how to relocate each instruction in the one or more sets of instructions to arbitrary locations, and b) relocate the instructions to arbitrary locations according to the specification; and an output module to send the instructions to the arbitrary locations.

An aspect of an embodiment of the present invention provides a non-transitory computer readable medium containing program instructions for providing computer security, wherein execution of the program instructions by one or more processors of a computer system causes the processor to carry out the following steps of: defining in a specification how to relocate blocks of instructions to arbitrary locations, the blocks of instructions being of an arbitrarily-selectable size; and providing the specification to an output device.

An aspect of an embodiment of the present invention provides a non-transitory computer readable medium containing program instructions for providing computer security, wherein execution of the program instructions by one or more processors of a computer system causes the processor to carry out the following steps of: relocating blocks of instructions to arbitrary locations, the blocks of instructions being of an arbitrarily-selectable size.

An aspect of an embodiment of the present invention provides a non-transitory computer readable medium containing program instructions for providing computer security, wherein execution of the program instructions by one or more processors of a computer system causes the processor to carry out the following steps of: defining in a specification how to relocate blocks of instructions to arbitrary locations, the blocks of instructions being of an arbitrarily-selectable size; and relocating blocks of instructions according to the specification.

An aspect of an embodiment of the present invention provides a non-transitory computer readable medium containing program instructions for providing computer security, wherein execution of the program instructions by one or more processors of a computer system causes the processor to carry out the following steps of: locating each instruction in one or more sets of instructions; defining in a specification how to relocate each of the instructions to arbitrary locations; and providing the specification to an output device.

An aspect of an embodiment of the present invention provides a non-transitory computer readable medium containing program instructions for providing computer security, wherein execution of the program instructions by one or more processors of a computer system causes the processor to carry out the following steps of: relocating each instruction in one or more files to arbitrary locations.

An aspect of an embodiment of the present invention provides a non-transitory computer readable medium containing program instructions for providing computer security, wherein execution of the program instructions by one or more processors of a computer system causes the processor to carry out the following steps of: defining in a specification how to relocate each instruction in one or more sets of instructions to arbitrary locations; and relocating the instructions to arbitrary locations according to the specification.

An aspect of an embodiment of the present invention provides a method and system (and related computer readable medium) for relocating executable instructions to arbitrary locations are disclosed. The instruction relocation may be arbitrary or random, and may operate on groups of instructions or individual instructions. Such relocation may be achieved through hardware or software, and may use a virtual machine, software dynamic translators, interpreters, or emulators. Instruction relocation may use or produce a specification governing how to relocate the desired instructions. Randomizing the location of instructions provides defenses against a variety of security attacks. The disclosed embodiments provide many advantages over other instruction relocation techniques, such as low runtime overhead, no required user interaction, applicability post-deployment, and the ability to operate on arbitrary executable programs. A number of representative embodiments and additional steps for more extensive instruction capture some of the many aspects of the disclosed invention.

These and other objects, along with advantages and features of the invention disclosed herein, will be made more apparent from the description, drawings, and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings.

FIG. 3B provides an example of the specification as embodied in a fallthrough map. The fallthrough map directs execution of instructions that do not have sequential locations. For example, the first location entry in the fallthrough map may correspond to the first instruction to be executed. The fallthrough map may move to the next entry and executes the instruction at that location. The entries comprise the rewrite rules.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS

Figure 1A:
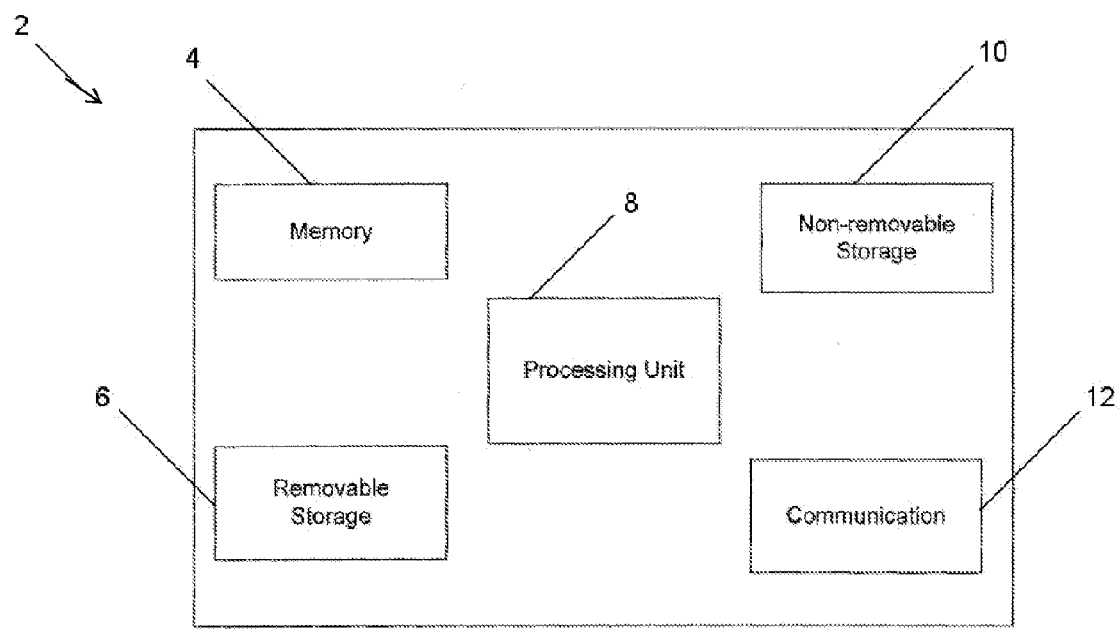
FIG. 1A schematically depicts a computing device in which an embodiment of the invention may be implemented. In its most basic configuration, the computing device may include at least one processing unit and memory. Memory may be volatile, non-volatile, or some combination of the two. Additionally, the device may also have other features and/or functionality. For example, the device may also include additional removable and/or non-removable storage including, but not limited to, magnetic or optical disks or tape, as well as writable electrical storage media.

Various embodiments or aspects of the invention may be implemented as software in a computing device, or alternatively, on hardware. For example, FIG. 1A schematically depicts a computing device 2 in which an embodiment of the invention may be implemented. In its most basic configuration, the computing device may include at least one processing unit 8 and memory 4. Memory 4 can be volatile, non-volatile, or some combination of the two. Additionally, the device 2 may also have other features and/or functionality. For example, the device may also include additional removable storage 6 and/or non-removable storage 10 including, but not limited to, magnetic or optical disks or tape, as well as writable electrical storage media. The device 2 may also include one or more communication connections 12 that may allow the device to communicate with other devices (e.g., other computing devices). The communication connections 12 may carry information in a communications media. Communications media may embody computer-readable instructions, data structures, program modules, or other data in a modulated data signal such as a carrier wave or other transport mechanism and may include any information delivery media. Computer-readable media may include both storage and communication media. A modulated data signal may include a signal that has one or more of its characteristics set or changes in such a manner as to encode, execute, or process information in the signal. For example, a communication medium may include wired media such as radio, RF, infrared, and other wireless devices.

In addition to implementation on a standalone computing machine, embodiments of the invention may also be implemented on a network system comprising a plurality of computing devices that are in communication with a networking means, such as a network with an infrastructure or an ad hoc network. The network connection may be wired, wireless, or a combination thereof.

Figure 1B:
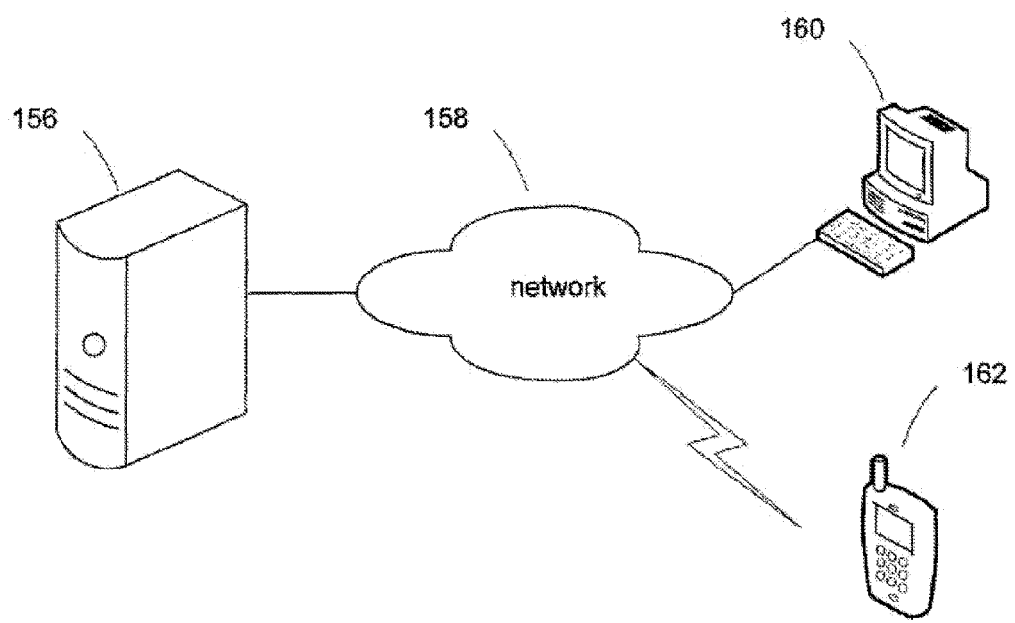
FIG. 1B schematically depicts a network system with an infrastructure or an ad hoc network in which embodiments of the invention may be implemented. In this example, the network system comprises a computer, network connection means, computer terminal, and PDA (e.g., a smartphone) or other handheld device.

As a way of example, FIG. 1B illustrates a network system in which embodiments of the invention may be implemented. In this example, the network system comprises a computer 156 (e.g., a network server), network connection means or structure 158 (e.g., wired and/or wireless connections), computer terminal 160, and PDA (e.g., a smart-phone) 162 (or other handheld or portable device, such as a cell phone, laptop computer, tablet computer, GPS receiver, mp3 player, handheld video player, pocket projector, etc. or handheld devices (or nonportable devices) with combinations of such features). The embodiments of the invention may be implemented in anyone of the devices of the system. For example, execution of the instructions or other desired processing maybe performed on the same computing device that is anyone of 156, 160, and 162. Alternatively, an embodiment of the invention maybe performed on different computing devices of the network system. For example, certain desired or required processing or execution may be performed on one of the computing devices of the network (e.g., server 156), whereas other processing and execution of the instruction may be performed at another computing device (e.g., terminal 160) of the network system, or vice versa. In fact, certain processing or execution may be performed at one computing device (e.g., server 156); and the other processing or execution of the instructions may be performed at different computing devices that may or may not be networked. For example, the certain processing may be performed at the terminal 160, while the other processing or instructions may be passed to a device 162 where the instructions are executed. This scenario may be of particular value especially when the PDA device, for example, accesses to the network through computer terminal 160 (or an access point in an ad hoc network). For another example, software to be protected may be executed, encoded or processed with one or more embodiments of the invention. The processed, encoded or executed software can then be distributed to customers. The distribution can be in a form of storage media (e.g. disk) or electronic copy.

Figure 2:
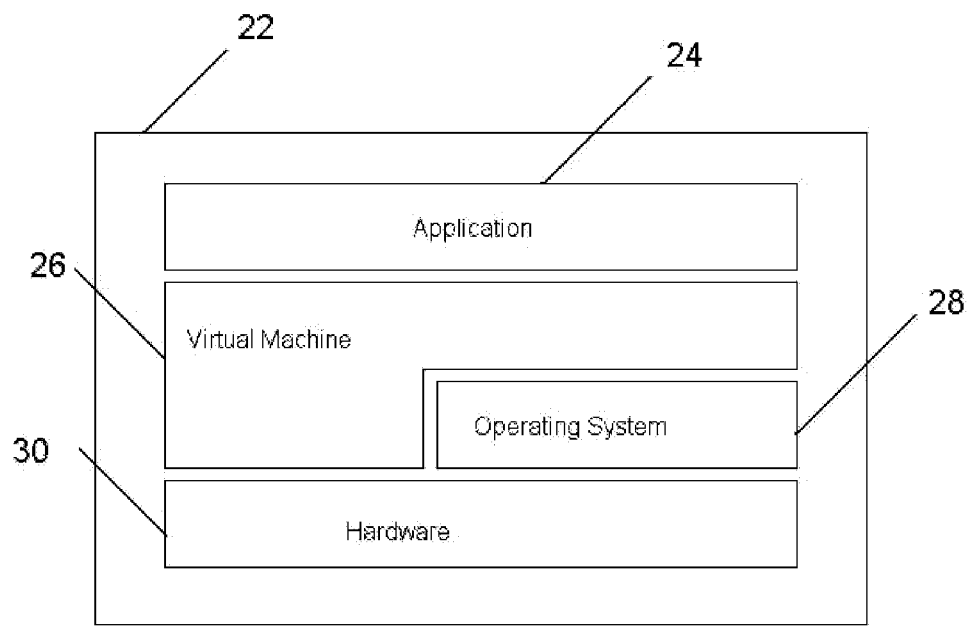
FIG. 2 schematically depicts a computing environment wherein a virtual machine operates. An operating system (OS) may be present in the computing environment. The application process may interface with the virtual machine, which in turn may operate with the OS and/or hardware.

Various embodiments or aspects of the invention may also use a virtual machine, other software dynamic translators, interpreters, or emulators. For instance, FIG. 2 schematically depicts a computing environment 22 wherein a virtual machine 26 operates. An operating system (OS) 28 may be present in the computing environment 22. The application process 24 interfaces with the virtual machine 26, which in turn may operate with the OS 28 and/or hardware 30.

Figure 6:
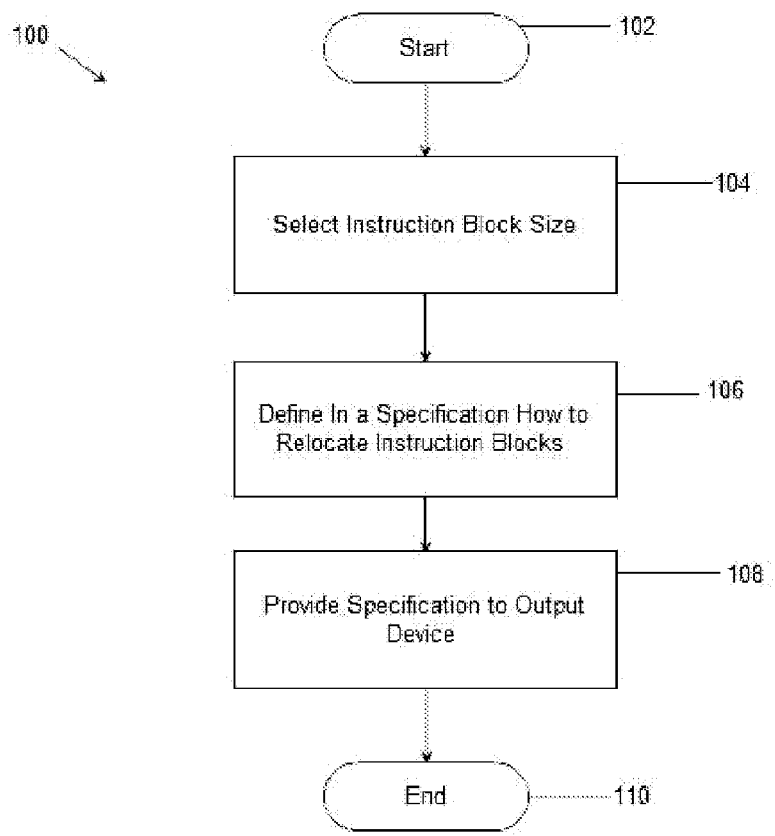
FIG. 6 schematically depicts a flowchart of an embodiment of one of the present invention's computer security methods where a specification may be produced.

An aspect of an embodiment of the present invention, as depicted in FIG. 6, is a method of computer security. The method 100 may include beginning 102 with selecting the size of the blocks of instructions 104, which may be performed by a human, computer algorithm, by random selection, and/or other means. The selected blocks of instructions 104 may be of any arbitrary size. The method may include defining in a specification 106 how to relocate blocks of instructions to arbitrary locations in address space or memory. The method 100 may conclude 110 by providing the specification to an output module 108. This output module 108 may include storage, memory, network or display.

The specification 106 may be produced by a compiler, assembler, linker, loader, or any similar tool. The specification 106 may define how to add, modify, or remove selected blocks of instructions 104, or any combination thereof. The specification 106 may define the execution sequence or execution successors of each instruction in the selected blocks of instructions 104. The specification 106 may also define in a second specification how to add, modify, or remove selected blocks of instructions 104, or any combination thereof.

In some embodiments, the selected blocks of instructions 104 may be scanned to flag blocks of instructions that may generate a set of relocation rules in the specification 106. For example, the selected blocks of instructions 104 may be scanned to identify potential indirect branches or potential indirect branch targets. The set of relocation rules may include refraining from relocating certain flagged instructions, relocating the targets of certain flagged instructions, storing the addresses of relocated instructions, and so on. For example, the specification 106 may define the locations of non-relocated instructions or rules for relocating certain instructions such as indirect branch targets. In another example, the specification 106 may provide rules for rewriting exception handling tables to contain the locations of potential indirect branch targets that have been relocated, or rules for modifying call instructions such that relocated return addresses are stored.

The selected blocks of instructions 104 may be contained in one or more files. These files may include any executable code sequence, such as binary code, shared libraries, java byte code, images, or any executable program. The selected blocks of instructions 104 may comprise all or only a portion of the file or files whose instructions may be relocated. The specification 106 may provide rules defining how to transform the one or more files to include in those files the relocation of the blocks of instructions in memory. In some embodiments, the one or more files may encode, include, or provides rules for generating the specification 106.

As will be discussed later in this disclosure, it should be appreciated that any of the methods described herein can be implemented in system form including a variety of hardware modules (components or devices) or firmware modules (components or devices), as well as on a computer readable medium.

Figure 7:
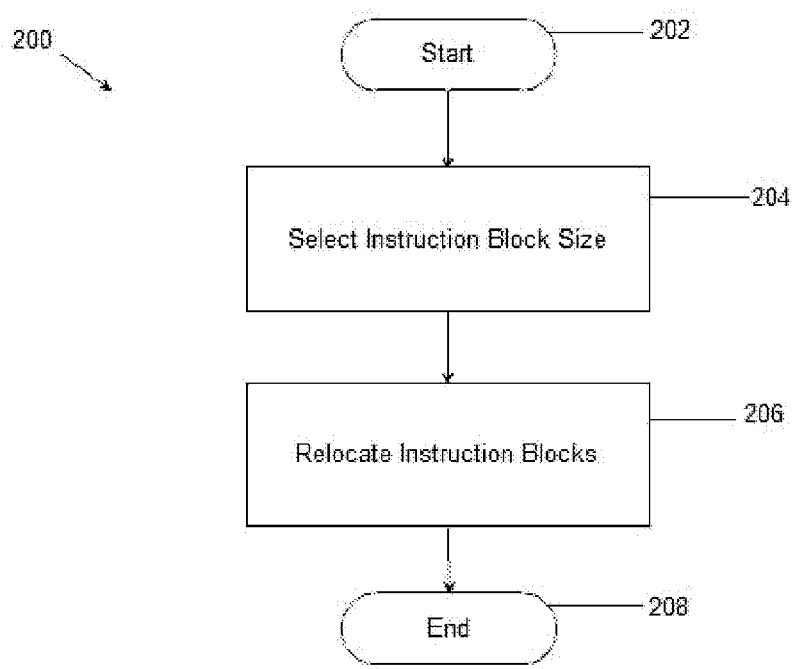
FIG. 7 schematically depicts a flowchart of an embodiment of one of the present invention's computer security methods where instruction blocks may be relocated to arbitrary locations.

Another aspect of the present invention is a method of computer security as depicted in FIG. 7. The method 200 may include beginning 202 with selecting the size of the blocks of instructions 204, which may be performed by a human, a computer algorithm, randomly, or by other means. The method may conclude 208 by relocating the instruction blocks to arbitrary locations 206 in address space or memory. The arbitrary locations may be fixed, systematically generated, or randomly seeded, or random.

In some embodiments, the relocation 206 of selected blocks of instructions 204 may occur pursuant to a specification defining how to relocate the blocks of instructions. The specification may define rules for adding, modifying, or removing blocks of instructions, or any combination thereof. The specification may define the instruction execution sequence or execution successors of the each instruction in the blocks of instructions 204. The relocation 206 may occur at any time, and may occur multiple times both before or after termination 208. Each relocation 206 may relocate the entirety of the blocks of instructions 204 or any portion thereof.

The selected blocks of instructions 204 may be processed by any number of computer tools including, but not limited to, a virtual machine, interpreter, execution-time complier or optimizer, simulator, emulator, binary rewriter, processing unit, hardware, or any combination thereof. For example, the blocks of instructions 204 may be processed by a per-process or system-level virtual machine, among others. In some embodiments, the virtual machine may implement the size selection 204 or apply the relocating rules 206. The processing tool may also process the blocks of instructions 204 in parallel.

For example, the processing tool may include a virtual machine to load any sequence of executable code, including those previously discussed, and process selected blocks of instructions 204. The virtual machine may be modified or otherwise configured to read rewrite rules, such as those defined in a specification, that relocate 206 blocks of instructions 204. The virtual machine may be configured such that its fetching mechanism first checks, then reads from the rewrite rules. The virtual machine may be modified to follow a specification's execution sequence or execution successors, provided by the rewrite rules. The virtual machine may also be configured to examine and translate the application's instruction before executing on a host machine.

The processing tool, such as a virtual machine, may also prevent revealing the locations of the relocated instructions 206. The processing tool may prevent revealing the locations by, among other things, ensuring that a program does not jump into the virtual machine's code or prevent relocated instructions from leaking to the user. This prevention may be accomplished by making the virtual machine's code and data inaccessible via standard memory protection mechanisms whenever the executable code it is processing is executing.

The processing tool, such as a virtual machine, may operate as a co-routine with the executable code whose instructions the machine is relocating. The examined or translated instructions may be held in the virtual machine's cache, or other memory equivalent. The virtual machine may capture and save the application's context, including the program counter, condition codes, registers, and similar entities. The virtual machine may then process the next application instruction, and repeat this process until completion 208. If the next instruction or block of instruction 204 has been cached or stored in memory, the virtual machine may transfer control to the stored instructions. If the next instruction or block of instruction 208 has not been stored, the virtual machine may allocate storage for the next instruction or block of instructions. The virtual machine may repeat this process until an end-of-fragment condition is met, such as an indirect branch, or the process otherwise terminates.

Figure 8:
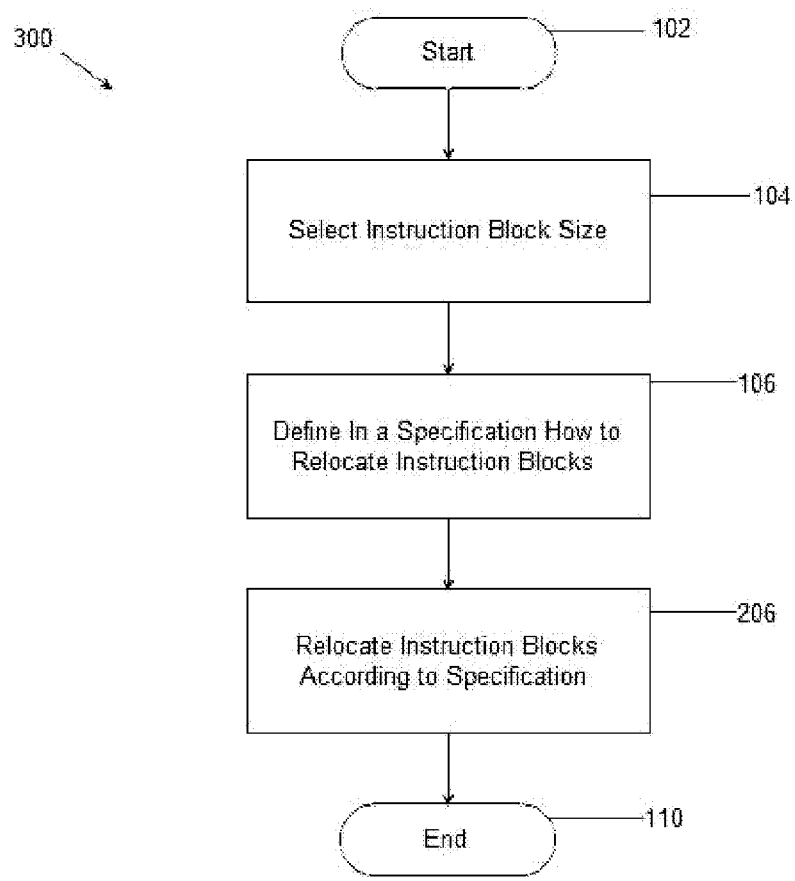
FIG. 8 schematically depicts a flowchart of an embodiment of one of the present invention's computer security methods where a specification may be defined and used to relocate instruction blocks.

It should be appreciated that various aspects of the invention may be combined to include any or all (or portions thereof) the various embodiments previously described. For example, an embodiment of the present invention as depicted in FIG. 8 incorporates the selection, specification generation, and relocation steps into the same method. The combined method 300 may include beginning 102 with selecting the size of the blocks of instructions 104. The selection 104 may be performed by a human, a computer algorithm, randomly, and/or by other means. The method 300 may include defining in a specification 106 how to relocate the blocks of instructions 104 to arbitrary locations in address space or memory. The method 300 may also include relocating 206 the blocks of instructions to arbitrary locations pursuant to the specification. The method may then conclude 110 by providing the specification to an output device 108 (not shown in FIG. 8). The combined method 300 may incorporate any or all of the various embodiments previously discussed.

Figure 9:
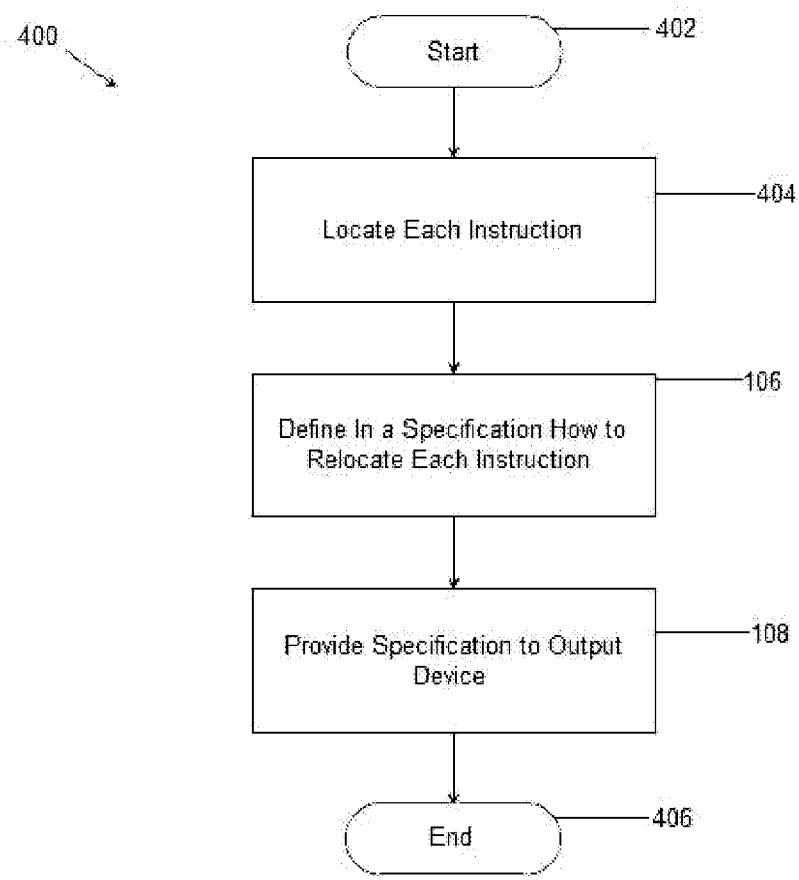
FIG. 9 schematically depicts a flowchart of an embodiment of one of the present invention's computer security methods where a specification may be produced defining how to relocate each instruction in one or more sets of instructions.

An aspect of the present invention, as depicted in FIG. 9, is a method of computer security. The method 400 may include beginning 402 by locating each instruction in one or more sets of instructions 404. In some embodiments, the sets of instructions will be one or more files. In some embodiments, locating each instruction 404 may be accomplished by iterating through the contents of one or more files, and may include inserting each of the instructions into a database after they are located. Locating each instruction 404 may be accomplished by a disassembly engine, such as a recursive descent disassembler, linear scan disassembler, or any similar tool. The disassembler or other tool may verify the instructions inserted into the database. Locating each instruction 404 may further include scanning the instructions to identify which instructions, if any, should not be relocated. The method may further include defining in a specification how to relocate each of said instructions to arbitrary locations 106 in address space or memory. In some embodiments, defining the specification 106 may be accomplished by a compiler, assembler, linker, loader, or by other means. The method may then conclude 406 by providing the specification to an output device or module 108.

In some embodiments, the method may further include identifying direct branch targets and/or indirect branch targets when locating each instruction 404. Defining the specification 106 may then include defining how to relocate the identified direct branch targets and/or potential indirect branch targets. Similarly, in some embodiments, the method may further include identifying functions in the set of instructions when locating each instruction 404. Defining the specification 106 may then include defining how to store located return addresses for each function call of the located functions. In some embodiments, the specification 106 may rewrite the call instructions and store the relocated addresses only for functions having standard function exits.

Figures 3A, 3B, 3C:
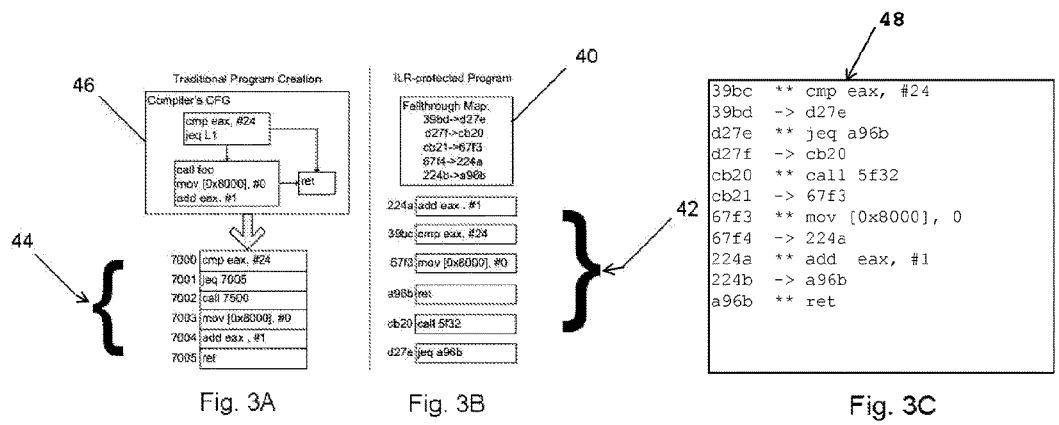
FIG. 3A schematically depicts an example of a control flow graph (CFG) in a traditional program creation that results in instructions being executed sequentially. Each instruction has a location. In the traditional program creation, the instructions have sequential locations based on the order of execution.
FIG. 3B schematically provides an example of an embodiment of the present computer security invention as implemented as an Instruction Location Randomization (ILR)-protected program.
FIG. 3C schematically depicts a possible embodiment of the rewriting rules.

FIG. 3A schematically depicts an example of traditional program creation as compared to FIG. 3B, an ILR-protected program. The control flow graph (CFG) 46 in the traditional program creation results in instructions being executed sequentially 44. Each instruction has a location. In the traditional program creation, the instructions have sequential locations based on the order of execution. FIG. 3B schematically provides an example of an embodiment of the present computer security invention as implemented as an Instruction Location Randomization (ILR)-protected program. FIG. 3B schematically depicts an example of a particular embodiment of the present invention specification as embodied in a fallthrough map 40. The fallthrough map directs execution of instructions 42 that do not have sequential locations. For example, the first location entry in the fallthrough map corresponds to the first instruction to be executed. The fallthrough map may move to the next entry and executes the instruction at that location. The entries comprise the rewrite rules, as presented in FIG. 3C.

FIG. 3C schematically depicts a possible embodiment of the rewriting rules. In this embodiment, the rules 48 come in two forms. The first form, the instruction definition form, indicates that there is an instruction at a particular location. The first line of gives an example. In this example, address 0x39bc has the instruction cmp eax, #24. Note that the rule indicates that if an instruction is fetched from address 0x39bc, that it should be the cmp instruction. However, data fetches from address 0x39bc are unaffected. This distinction allows ILR to relocate instructions even if instructions and data are overlapped. An example of a second form of an ILR rewrite rule, the redirect form, is shown in the second line of FIG. 3C. This line specifies the fallthrough instruction for the cmp at location 0x39bc. A traditional program execution would immediately fetch from the location 0x39bd after fetching the cmp instruction. Instead, in this embodiment, ILR execution checks for a redirection of the fallthrough. In this case, the fallthrough instruction is at 0xd27e. The remaining lines show the full set of rewrite rules for the example in FIG. 3B. The ILR architecture may then fetch, decode and execute instructions in the traditional style, but checks for rewriting rules before fetching an instruction or calculating an instruction's fallthrough address.

Figure 4:
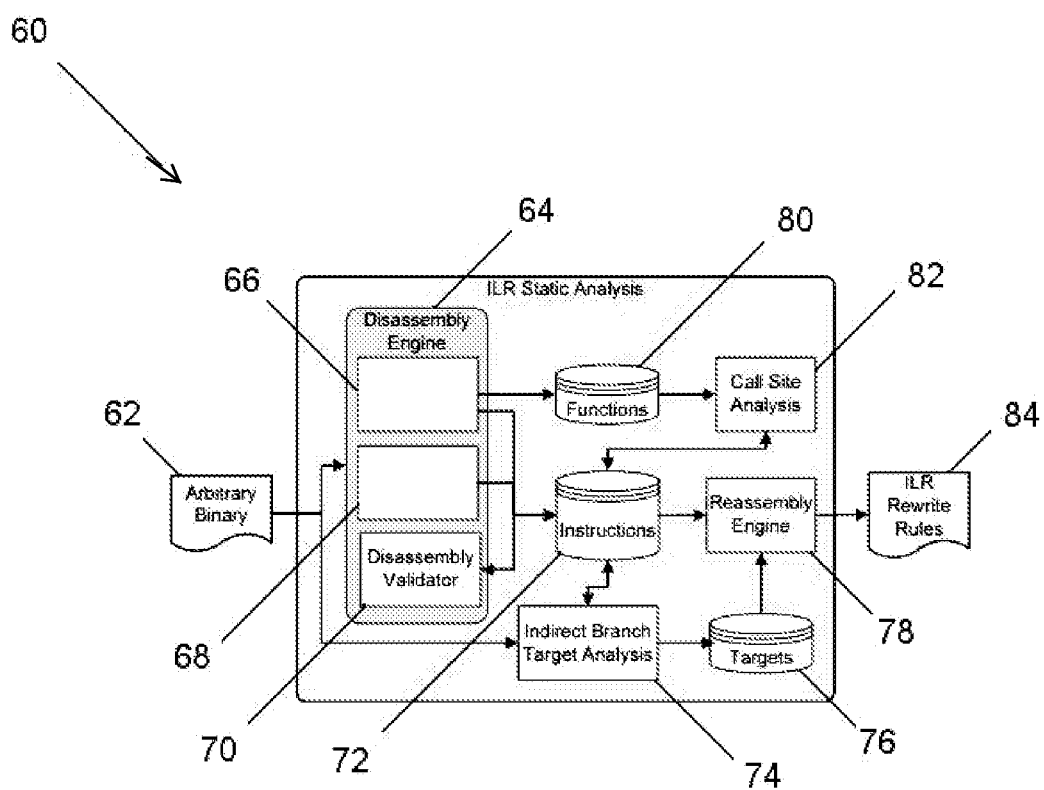
FIG. 4 schematically depicts steps that may be taken in static analysis to create rewrite rules. The arbitrary binary may first be analyzed through steps in the disassembly engine to identify the instructions. This may be accomplished through the use of a recursive descent disassembler or a linear scan disassembler. The instructions may then be inserted into a database. A disassembly validator may be used. The recursive descent disassembler may also be used to detect functions in the arbitrary binary. Call site analysis may be applied to randomize the return addresses for functions. Indirect branch target (IBT) analysis may be used to identify which parts of the arbitrary binary are IBTs. The reassembly engine may then operate to create the rewrite rules for each instruction in the database.

FIG. 4 depicts steps that may be taken in static analysis 60 to create rewrite rules. The arbitrary binary 62 may first be analyzed through steps in the disassembly engine 64 to identify the instructions. This may be accomplished, for example but not limited thereto, through the use of a recursive descent disassembler 66 and a linear scan disassembler 68. The instructions 72 may then be inserted into a database. A disassembly validator 70 may be used. The recursive descent disassembler 66 may also be used to detect functions 80 in the arbitrary binary. Call site analysis 82 may be applied to randomize the return addresses for functions. Indirect branch target (IBT) analysis 74 may be used to identify which parts of the arbitrary binary are IBTs and provide those targets 76 to the reassembly engine 78. The reassembly engine 78 may then operate to create the rewrite rules 84 for each instruction in the database.

Figure 5:
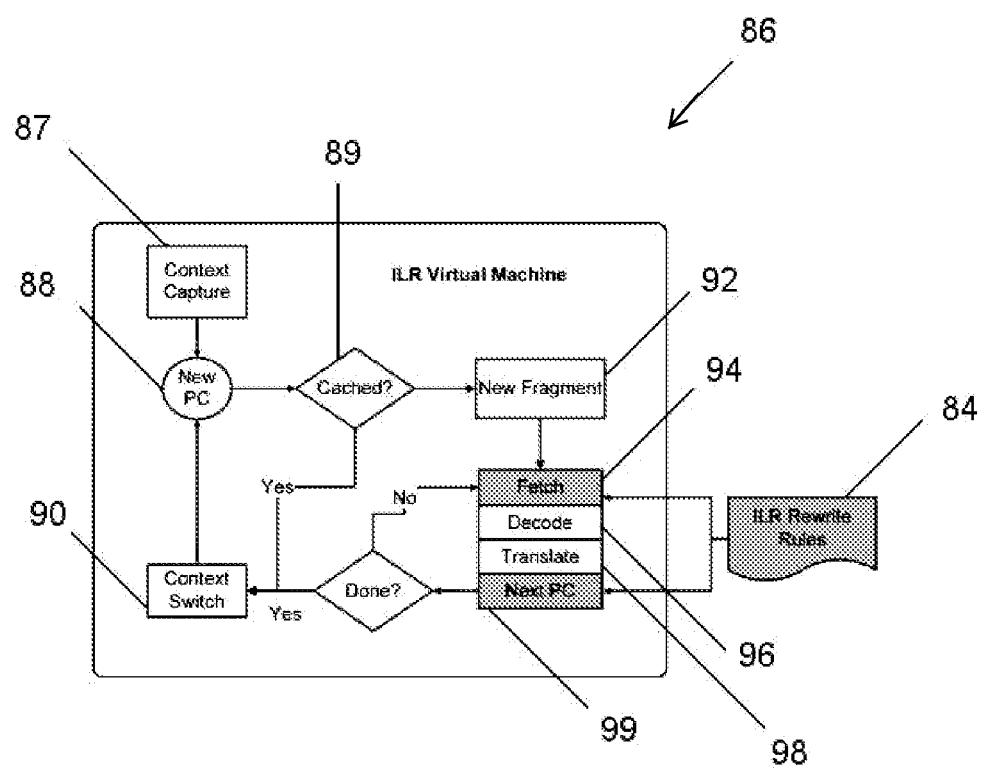
FIG. 5 schematically depicts how rewrite rules generated by static analysis may be used when running a program that utilizes ILR. In this instance, a virtual machine may be used for implementation. The application context (e.g., program counter (PC), condition codes, registers, etc.) may be captured in context capture. The virtual machine may then process the next application instruction. If a translation for the instruction has already been cached, it may be moved to the next instruction. If a translation has not been cached, the virtual machine may allocate storage in the fragment cache for a new fragment of translated instructions. The rewrite rules may be used to fetch, decode, and translate a new set of instructions in the application until the end of the fragment is reached.

FIG. 5 provides an aspect of an embodiment depicting an example of how rewrite rules 84 generated by static analysis may be used when running a program that utilizes ILR. In this instance 86, a virtual machine may be used for implementation, for example but not limited thereto. The virtual machine starts by capturing the application context 87 (e.g., program counter (PC) 88, condition codes, registers, etc.). The captured PC is considered the "New PC" 88. If a translation for the instruction at the PC has already been cached 89, it may used immediately. If a translation has not been cached, the virtual machine may allocate storage in the fragment cache for a new fragment 92 of translated instructions. The virtual machine may populate the fragment by fetching 94, decoding 96, and translating 98 application instructions one-by-one through successive program counters 99 until the end of the fragment condition is reached. The virtual machine may then proceed to restore the captured context 90, and execute the translated fragment, after which the VM operates on the next requested PC, starting the procedure anew.

Figure 10:
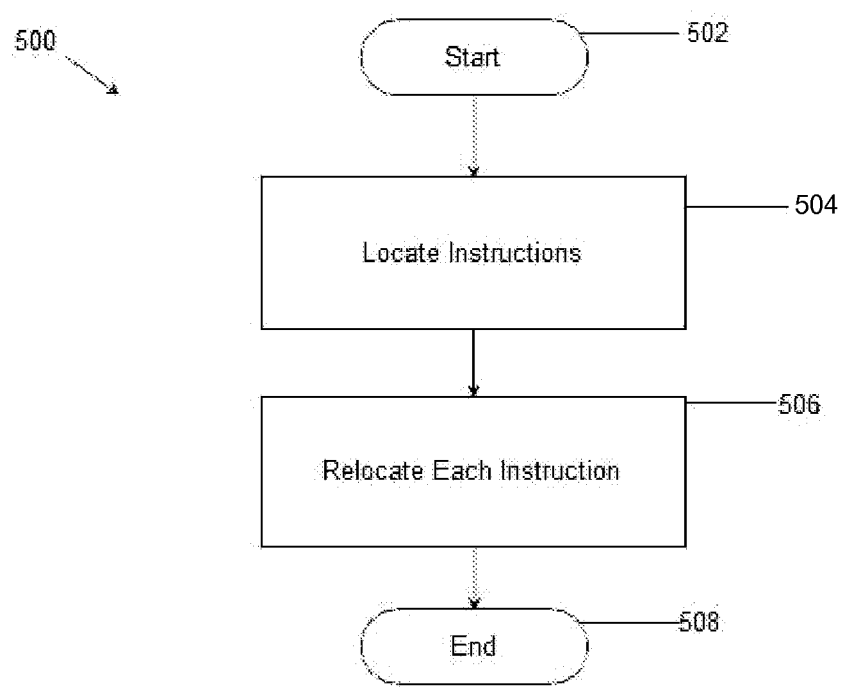
FIG. 10 schematically depicts a flowchart of an embodiment of one of the present invention's computer security methods where each instruction in one or more sets of instructions may be relocated.

An aspect of the present invention, as embodied in FIG. 10, is a method of computer security. The method 500 may begin 502 by locating each instruction in one or more files 504. The method may then conclude 508 by relocating each instruction 506 to arbitrary locations in address space or memory.

In some embodiments, the relocating of each instruction 506 may include processing the instructions by an interpreter, execution-time compiler or optimizer, simulator, emulator, binary writer, processing unit, hardware, or a virtual machine. The instructions may also be processed in parallel. The virtual machine may be a per-process virtual machine, and may prevent revealing the locations of the relocated instructions after the relocating of each instruction 506.

In some embodiments, the relocating of each instruction 506 may occur according to a specification. The specification may define how to relocate direct branch targets and/or potential indirect branch targets. The relocating of each instruction 506 may then include relocating of direct branch targets and potential indirect branch targets. Similarly, the specification may also define how to store relocated return addresses for each function call in the set of instructions. The relocating of each instruction 506 may then include relocating the return addresses for the function calls. The specification may define how to add, modify, and/or remove each instruction. The specification may define the instruction execution sequence, and may define the execution successors of each instruction.

Figure 11:
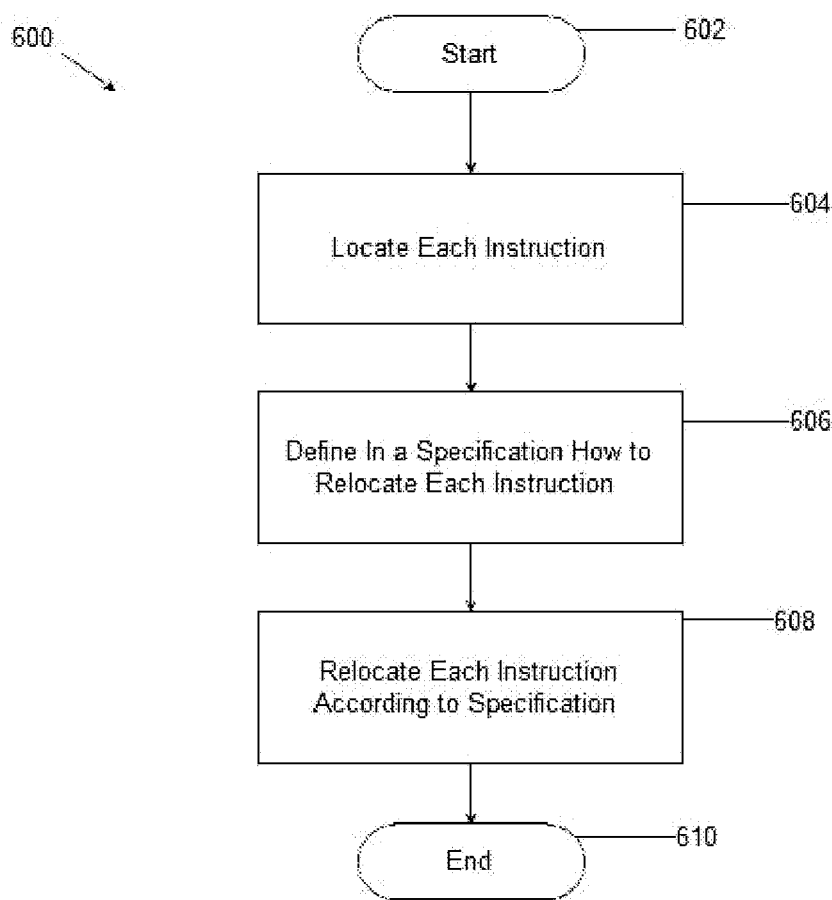
FIG. 11 schematically depicts a flowchart of an embodiment of one of the present invention's computer security methods where each instruction in one or sets of instructions may be relocated according to a specification defining how to relocate those instructions.

It should be appreciated that various aspects of the invention may be combined to include any or all (or portions thereof) the various embodiments in combination. For example, an aspect of the present invention, as depicted in FIG. 11, is a method of computer security. The method 600 may begin 602 by locating each instruction in one or more sets of instructions 604. The method may include defining in a specification how to relocate each instruction to arbitrary locations 606. The method may then conclude 610 by relocating each instruction according to the specification 608. This method may further include any of the embodiments of method 400 and 500 in combination.

Figure 12:
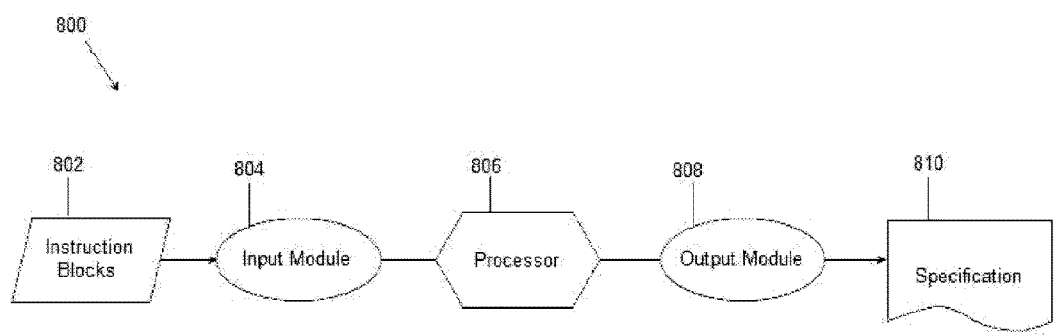
FIG. 12 schematically depicts an embodiment of one of the present invention's systems where instruction blocks may serve as an input to an input module, a processor may be configured to define in a specification how to relocate instructions in the instruction blocks, and an output module may transmit that specification.
Figure 13:
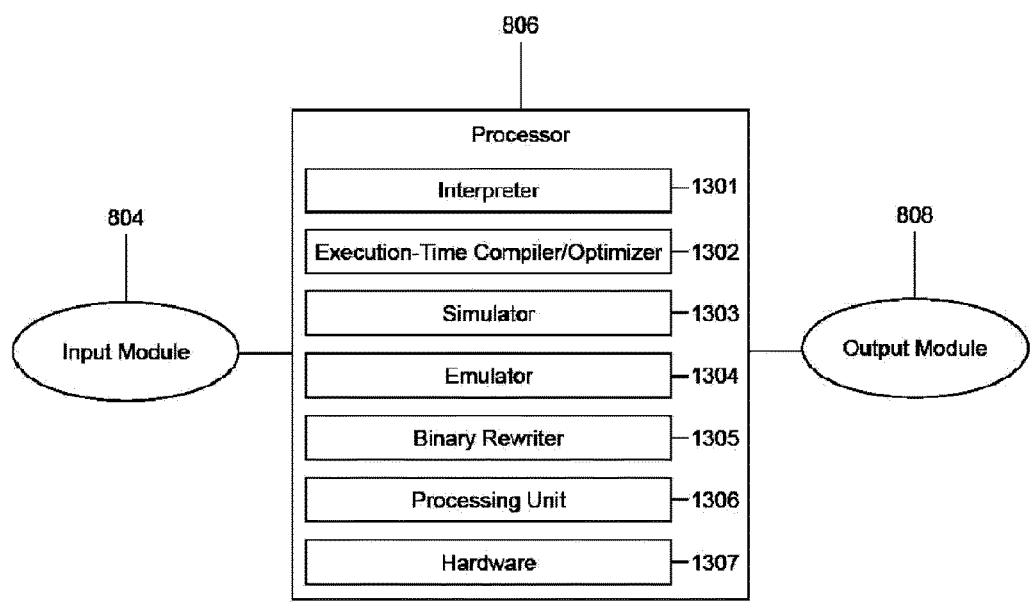
FIG. 13 schematically depicts the processor used in various embodiments of the present invention's systems and some of what may be included in the processor.

It should also be appreciated that any of the above methods (or portions thereof, as well as any combinations of the methods or portions of the methods) can be implemented in system form (as well as in computer readable medium form). For example, an aspect of the present invention, as embodied in FIG. 12, is a system. The system 800 may include blocks of instructions 802 of an arbitrarily-selectable size. The size may be selected by a human, a computer algorithm, randomly, or by some other means. The system may include an input module 804 to receive the blocks of instructions. The system may contain a processor 806 that receives the blocks of instructions from the input module 804. The processor 806 may be configured to define in a specification 810 how to relocate the blocks of instructions 802 to arbitrary locations in address space or memory. The system may include the capability to implement any of the embodiments (or portions thereof) discussed in the description of method 100. As depicted in FIG. 13, the processor 806 may include an interpreter 1301, execution-time compiler or optimizer 1302, simulator 1303, emulator 1304, binary rewriter, 1305, a processing unit 1306, or any hardware processor 1307 able to process blocks of instructions 802. The processor 806 may comprise multiple processors operating in parallel. The processor 806 may then send the specification to an output module 808. The output module 808 may then transmit the specification 810. The system may include the capability to implement any of the embodiments (or portions thereof) discussed in the description of method 100 (as well as any of the other methods disclosed herein).

Figure 14:
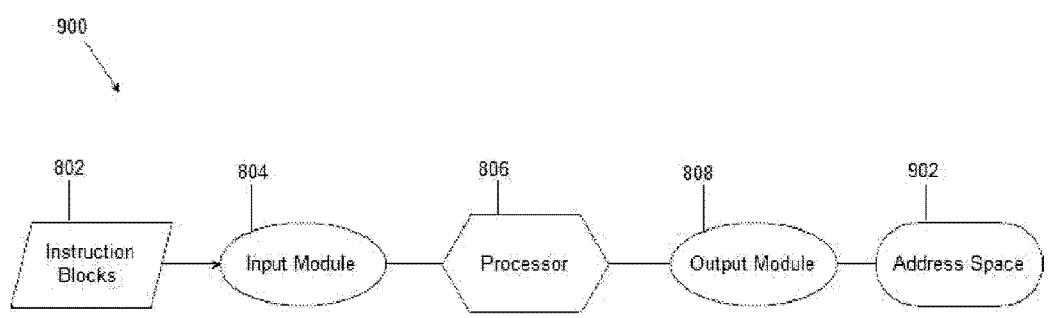
FIG. 14 schematically depicts an embodiment of one of the present invention's systems where instruction blocks may serve as input to an input module, a processor may be configured to relocate the instructions, and the instructions may be output to arbitrary locations in address space.

An aspect of the present invention, as depicted in FIG. 14, is a system for computer security. The system 900 may include blocks of instructions 802 of an arbitrarily-selectable size. The size may be selected by a human, a computer algorithm, randomly, or by some other means. The system may include an input module 804 to receive the blocks of instructions. The system may contain a processor 806 which receives the blocks of instructions 802 from the input module 804. The processor may be configured to relocate the blocks of instructions 802 to arbitrary locations. The blocks of instructions 802 may then be sent to an output module 808 that sends them to arbitrary locations in address space 902 or memory. The system may include the capability to implement any of the embodiments (or portions thereof) discussed in the description of method 200.

Figure 15:
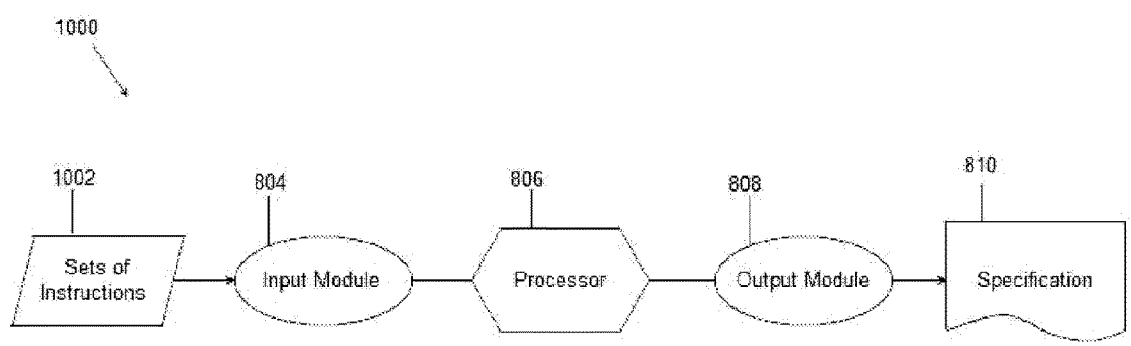
FIG. 15 schematically depicts an embodiment of one of the present invention's systems where sets of instructions may be received as input to an input module, a processor may be configured to define in a specification how to relocate the instructions, and an output module may be used to transmit that specification.

An aspect of the present invention, as depicted in FIG. 15, is a system for computer security. The system 1000 may include sets of instructions 1002 that are received by an input module 804. The system may include a processor 806 configured to locate each instruction in the sets of instructions and define in a specification 810 how to relocate each of them to arbitrary locations in address space or memory. The system may include an output module 808 that receives the specification 810 from the processor 806 and transmits it. The system may include the capability to implement any of the embodiments (or portions thereof) discussed in the description of method 400.

Figure 16:
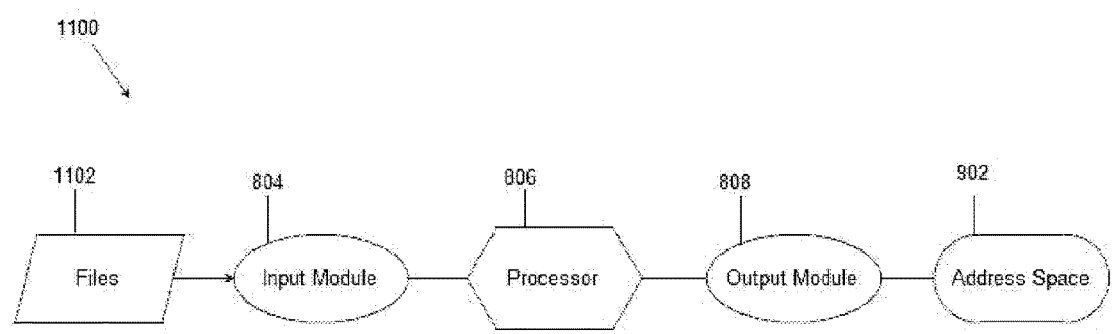
FIG. 16 schematically depicts an embodiment of one of the present invention's systems where an input module may receive files as input, a processor may be configured to relocate each instruction in those files, and an output module may be used to transmit those instructions to arbitrary locations in address space.

An aspect of the present invention, as depicted in FIG. 16, is a system for computer security. The system 1100 may include an input module 804 that receives files 1102. The system may further include a processor 806 configured to relocate each instruction in the files to arbitrary locations. The system may also include an output module 808 that receives the instructions from the processor 806 and sends them to their arbitrary locations in address space 902 or memory. The system may include the capability to implement any of the embodiments (or portions thereof) discussed in the description of method 500.

Figure 17:
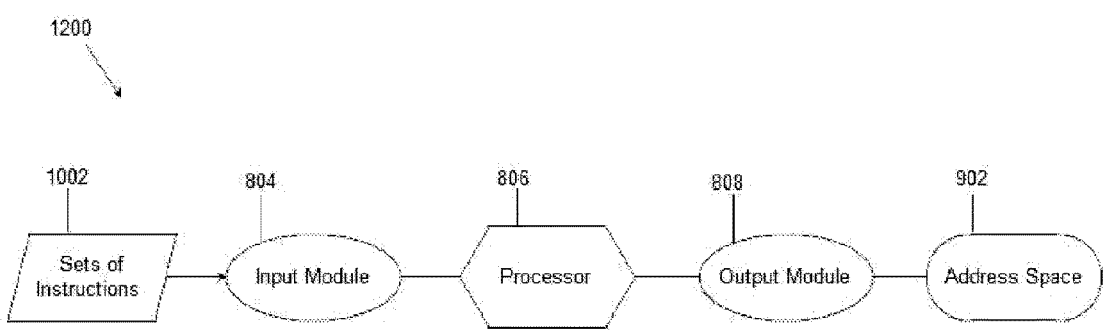
FIG. 17 schematically depicts an embodiment of one of the present invention's systems where an input module may receive sets of instructions as input, a processor may be configured to define in a specification how to relocate those instructions and to relocate the instructions according to that specification, and an output module may transmit the instructions to arbitrary locations in address space.

An aspect of the present invention, as depicted in FIG. 17, is a system for computer security. The system 1200 may include sets of instructions 1002 that are received by an input module 804. The input module 804 may then pass the sets of instructions 1002 to a processor 806. The processor 806 may be configured to define in a specification how to relocate each instruction to arbitrary locations. The processor 806 may also be configured to relocate the instructions to arbitrary locations according to the specification. The system may also include an output module 808 that receives the instructions from the processor 806 and sends them to their arbitrary locations in address space 902 or memory. The system may include the capability to implement any of the embodiments (or portions thereof) discussed in the description of method 600.

In summary, any of the methods (100, 200, 300, 400, 500, or 600) or portions thereof (alone or in combination) may be implemented in system form including a variety of hardware modules or firmware modules, as well as computer readable medium form.

In summary, any of the systems (800, 900, 1000, 1100, or 1200) or portions thereof (alone or in combination) may be implemented together for the purpose of practicing the invention.

Figure 18:
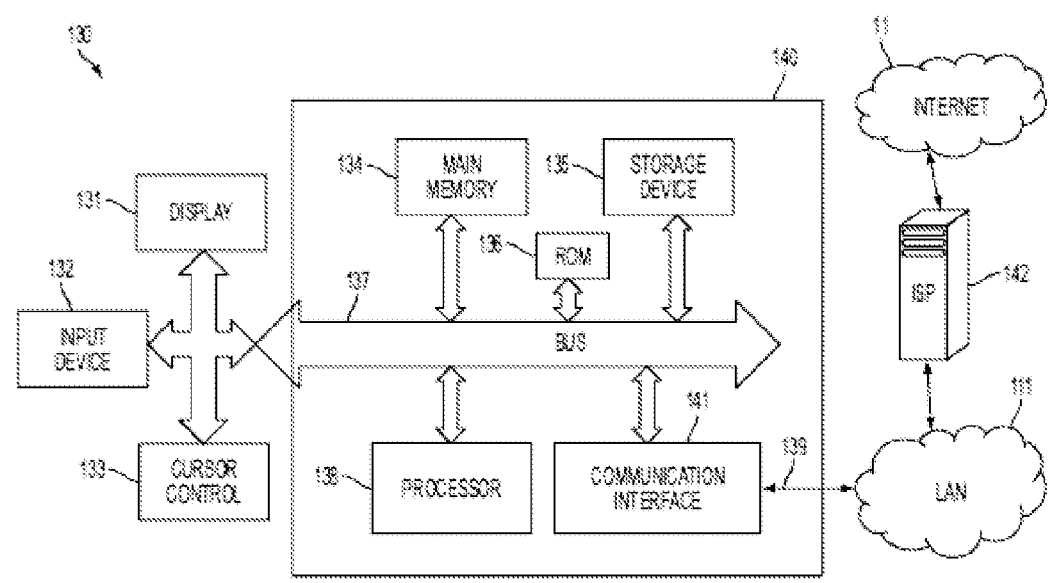
FIG. 18 schematically depicts a block diagram for a system or related method of an embodiment of the present invention in whole or in part.

FIG. 18 is a block diagram that illustrates a system 130 including a computer system 140 and the associated Internet 11 connection upon which an embodiment may be implemented. Such configuration is typically used for computers (hosts) connected to the Internet 11 and executing a server or a client (or a combination) software. A source computer such as laptop, an ultimate destination computer and relay servers, for example, as well as any computer or processor described herein, may use the computer system configuration and the Internet connection shown in FIG. 18. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 18 illustrates various components of a computer system, it is not intended to represent any particular architecture or manner of interconnecting the components; as such details are not germane to the present invention. It will also be appreciated that network computers, handheld computers, cell phones and other data processing systems that have fewer components or perhaps more components may also be used. The computer system of FIG. 18 may, for example, be an Apple Macintosh computer or Power Book, or an IBM compatible PC. Computer system 140 may include a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138.

Main memory 134 also may be used for storing temporary variables or other intermediate information during execution of instructions to be executed by processor 138. Computer system 140 further includes a Read Only Memory (ROM) 136, other non-volatile memory, or other static storage device coupled to bus 137 for storing static information and instructions for processor 138. A storage device 135 may be coupled to the bus 137 for storing information and instructions. The storage device 135 may include a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, may be coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") as used herein is an extensible term that refers to any medium or any memory, that participates in providing instructions to a processor, (such as processor 138) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio wave and infrared data communications, or other form of propagated signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infra-red transmitter to convert the data to an infra-red signal. An infra-red detector may receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also may include a communication interface 141 coupled to bus 137. Communication interface 141 provides a two-way data communication coupling to a network link 139 that is connected to a local network 111. For example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE802.3 standard may be used such as 10/100BaseT, 1000BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (June 1999), "Internetworking Technologies Handbook", Chapter 7: "Ethernet Technologies", pages 7-1 to 7-38, which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet "LAN91C111 10/100 Non-PCI Ethernet Single Chip MAC+PHY" Data-Sheet, Rev. 15 (Feb. 20, 2004), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and the signals on the network link 139 and through the communication interface 141, which carry the digital data to and from computer system 140, are exemplary forms of carrier waves transporting the information.

The processor 138 may execute received code as it is received, and/or stored in storage device 135, or other non-volatile storage for later execution. In this manner, computer system 140 may obtain application code in the form of a carrier wave.

The concept of instruction location randomization may be implemented and utilized with the related processors, networks, computer systems, internet, modules, and components and functions according to the schemes disclosed herein.

EXAMPLES

Practice of an aspect of an embodiment (or embodiments) of the invention will be still more fully understood from the following examples and experimental results, which are presented herein for illustration only and should not be construed as limiting the invention in any way.

Experimental Setup

The following examples were evaluated using the SPEC CPU2006 benchmark suite. The benchmarks include processor, memory, and compiler stressing. The benchmarks are provided as source, and were compiled with gcc, g++, or gfortran as dictated by the program's source code. The benchmarks were compiled at optimization level –O2, and used static linking Static linking was used to, among other things, test the effectiveness of various embodiments of the invention at unpacking and arbitrarily relocating large bodies of code. Furthermore, placing all the code packages into one executable increased the attack surface of the programs, making them more vulnerable to an attack. The experiments were performed on a system with a quad-core, AMD Phenom II B55 processor running at 3.2 GHz. The machine has 512 KB of L1 cache, 2 MB of L2 cache, 6 MB of L3 cache, and 4 GB of main memory.

Example Set No. 1

Arc-Injection Attack on Student Grading Program

A small program (44 lines of code) was constructed implementing a simple stack-based buffer overflow. The program assigned grades to students based on an input, such as the student's name. If left unprotected, a malicious input might cause a buffer overflow, enabling an attack. An arc-injection attack was created such that the program would print out a grade of "B" when the student should have received a "D." Both address space layout randomization (ASLR) and W⊕A were unable to thwart the arc-injection attack. ASLR proved ineffective because only the unrandomized addresses in the main program were used, not the randomized addresses. W⊕A was also ineffective because the attack only relied on instructions that were already part of the program. An embodiment of the invention, however, was able to prevent the attack.

Example Set No. 2

Return-Oriented Programming Attack on Student Grading Program

A return-oriented programming (ROP) attack was constructed and subjected to the same grading program as described in Example Set No. 1. The ROP attack was designed to cause the grading program to initiate a shell program, printing the affected student's grade as an A. Both ASLR and W⊕A were unable to defeat the ROP attack, but an embodiment of the invention successfully defended the grading program.

Example Set No. 3

Ubuntu PDF Viewer

An embodiment of the present invention was applied to Ubuntu's PDF viewer, xpdf. A vulnerability was seeded in the input processing routines of xpdf that emitted a stack overflow in response to an appropriately long input. A ROP attack was created to cause the PDF viewer to produce a shell. Despite the ROP attack, an embodiment of the present invention was able to prevent the attack.

Example Set No. 4

Adobe PDF Viewer

Version 9.3.0 of Adobe's PDF viewer, acroread, was downloaded from Adobe's website. Acroread is a 24 MB executable vulnerable to arc-injection and ROP attacks when parsing image files. With information available from Security Focus's website, a malicious PDF file was created to effect a ROP attack. An embodiment of the present invention processed the large executable, randomized the instructions, and foiled the ROP attack.

ADDITIONAL EXAMPLES

Example 1

Includes a method of computer security, the method comprising:
defining in a specification how to relocate blocks of instructions to arbitrary locations, the blocks of instructions being of an arbitrarily-selectable size; and
providing the specification to an output device.

Example 2

The method of example 1 (as well as any one or more of example nos. 3-132), wherein the arbitrarily-selectable size is selected by a human, by a computer algorithm, and/or by random selection.

Example 3

The method of example 1 (as well as any one or more of example nos. 2, and 4-132), wherein the specification is produced by a compiler, assembler, linker, or loader.

Example 4

The method of example 1 (as well as any one or more of example nos. 2-132), wherein the output device includes storage, memory, network, or a display.

Example 5

The method of example 1 (as well as any one or more of example nos. 2-132), wherein the specification defines how to add, modify, and/or remove the blocks of instructions.

Example 6

The method of example 1 (as well as any one or more of example nos. 2-132), wherein the specification defines the locations of non-relocated instructions.

Example 7

The method of example 1 (as well as any one or more of example nos. 2-132), wherein the specification defines the instruction execution sequence.

Example 8

The method of example 1 (as well as any one or more of example nos. 2-132), wherein the specification defines the execution successors of each instruction in the blocks of instructions.

Example 9

The method of example 1 (as well as any one or more of example nos. 2-132), wherein the blocks of instructions are contained in one or more files.

Example 10

The method of example 9 (as well as any one or more of example nos. 2-132), wherein the blocks of instructions comprise only a portion of the one or more files.

Example 11

The method of example 1 (as well as any one or more of example nos. 2-132), further comprising scanning the blocks of instructions to identify instructions which should not be relocated.

Example 12

The method of example 11 (as well as any one or more of example nos. 2-132), wherein the scanning identifies potential indirect branch targets.

Example 13

The method of example 1 (as well as any one or more of example nos. 2-132), further comprising scanning the blocks of instructions to identify potential indirect branch targets.

Example 14

The method of example 13 (as well as any one or more of example nos. 2-132), wherein the specification further defines rules for relocating the potential indirect branch targets.

Example 15

The method of example 14 (as well as any one or more of example nos. 2-132), further comprising rewriting exception handling tables to contain the locations of the potential indirect branch targets that have been relocated.

Example 16

The method of example 1 (as well as any one or more of example nos. 2-132), wherein the specification further comprises rules for modifying call instructions such that relocated return addresses are stored.

Example 17

The method of example 9 (as well as any one or more of example nos. 2-132), wherein the specification defines transforming the one or more files to include in the one or more files the relocation of the blocks of instructions to arbitrary locations.

Example 18

The method of example 1, wherein the specification further defines in a second specification how to add, modify, and/or remove blocks of instructions.

Example 19

The method of example 9 (as well as any one or more of example nos. 2-132), further comprising encoding the one or more files with the specification.

Example 20

Includes a method of computer security (as well as any one or more of example nos. 2-132), the method comprising: relocating blocks of instructions to arbitrary locations, the blocks of instructions being of an arbitrarily-selectable size.

Example 21

The method of example 20 (as well as any one or more of example nos. 2-132), wherein the relocation occurs according to a specification, the specification defining how to relocate the blocks of instructions.

Example 22

The method of example 21 (as well as any one or more of example nos. 2-132), wherein the specification defines how to add, modify, and/or remove the blocks of instructions.

Example 23

The method of example 21 (as well as any one or more of example nos. 2-132), wherein the specification defines the instruction execution sequence.

Example 24

The method of example 21 (as well as any one or more of example nos. 2-132), wherein the specification defines the execution successors of each instruction.

Example 25

The method of example 20 (as well as any one or more of example nos. 2-132), wherein the relocated blocks of instructions may be re-relocated at any time.

Example 26

The method of example 25 (as well as any one or more of example nos. 2-132), wherein the re-relocation relocates only a portion of the relocated blocks of instructions.

Example 27

The method of example 20 (as well as any one or more of example nos. 2-132), wherein the blocks of instructions are processed by a virtual machine.

Example 28

The method of example 27 (as well as any one or more of example nos. 2-132), wherein the virtual machine is a per-process virtual machine.

Example 29

The method of example 27 (as well as any one or more of example nos. 2-132), wherein the virtual machine prevents revealing of the relocated instruction locations.

Example 30

The method of example 27 (as well as any one or more of example nos. 2-132), wherein the virtual machine is a system-level virtual machine.

Example 31

The method of example 20 (as well as any one or more of example nos. 2-132), wherein the arbitrary locations are randomized.

Example 32

The method of example 20 (as well as any one or more of example nos. 2-132), wherein the blocks of instructions are processed by an interpreter.

Example 33

The method of example 20 (as well as any one or more of example nos. 2-132), wherein the blocks of instructions are processed by an execution-time compiler or optimizer.

Example 34

The method of example 20 (as well as any one or more of example nos. 2-132), wherein the blocks of instructions are processed by a simulator or an emulator.

Example 35

The method of example 20 (as well as any one or more of example nos. 2-132), wherein the blocks of instructions are processed by a processing unit.

Example 36

The method of example 20 (as well as any one or more of example nos. 2-132), wherein the blocks of instructions are processed by a binary rewriter.

Example 37

The method of example 20 (as well as any one or more of example nos. 2-132), wherein the blocks of instructions are processed by hardware.

Example 38

The method of example 20 (as well as any one or more of example nos. 2-132), wherein the blocks of instructions are processed in parallel.

Example 39

Includes a method of computer security, the method comprising:
defining in a specification how to relocate blocks of instructions to arbitrary locations, the blocks of instructions being of an arbitrarily-selectable size; and
relocating blocks of instructions according to the specification.

Example 40

The method of example 39 (as well as any one or more of example nos. 2-132), wherein the arbitrarily-selectable size is selected by a human, by a computer algorithm, and/or by random selection.

Example 41

The method of example 39 (as well as any one or more of example nos. 2-132), wherein the specification is produced by a compiler, assembler, linker, or loader.

Example 42

The method of example 39 (as well as any one or more of example nos. 2-132), wherein the specification defines how to add, modify, and/or remove the blocks of instructions.

Example 43

The method of example 39 (as well as any one or more of example nos. 2-132), wherein the specification defines the locations of non-relocated instructions.

Example 44

The method of example 39 (as well as any one or more of example nos. 2-132), wherein the specification defines the instruction execution sequence.

Example 45

The method of example 39 (as well as any one or more of example nos. 2-132), wherein the specification defines the execution successors of each instruction in the blocks of instructions.

Example 46

The method of example 39 (as well as any one or more of example nos. 2-132), wherein the blocks of instructions are contained in one or more files.

Example 47

The method of example 39 (as well as any one or more of example nos. 2-132), wherein the blocks of instructions comprise only a portion of the one or more files.

Example 48

The method of example 39 (as well as any one or more of example nos. 2-132), further comprising scanning the blocks of instructions to identify instructions which should not be relocated.

Example 49

The method of example 39 (as well as any one or more of example nos. 2-132), further comprising scanning the blocks of instructions to identify potential indirect branch targets.

Example 50

The method of example 49 (as well as any one or more of example nos. 2-132), wherein the specification further defines rules for relocating the potential indirect branch targets.

Example 51

The method of example 50 (as well as any one or more of example nos. 2-132), further comprising rewriting exception handling tables to contain the locations of the potential indirect branch targets that have been relocated.

Example 52

The method of example 39 (as well as any one or more of example nos. 2-132), wherein the specification further comprises rules for modifying call instructions such that relocated return addresses are stored.

Example 53

The method of example 46 (as well as any one or more of example nos. 2-132), wherein the specification defines transforming the one or more files to include in the one or more files the relocation of the blocks of instructions to arbitrary locations.

Example 54

The method of example 39 (as well as any one or more of example nos. 2-132), wherein the specification further defines how to add, modify, and/or remove blocks of instructions in a second specification.

Example 55

The method of example 46 (as well as any one or more of example nos. 2-132), further comprising encoding the one or more files with the specification.

Example 56

The method of example 39 (as well as any one or more of example nos. 2-132), wherein the relocated blocks of instructions may be re-relocated at any time.

Example 57

The method of example 56 (as well as any one or more of example nos. 2-132), wherein the re-relocation relocates only a portion of the relocated blocks of instructions.

Example 58

The method of example 39 (as well as any one or more of example nos. 2-132), wherein the blocks of instructions are processed by a virtual machine.

Example 59

The method of example 58 (as well as any one or more of example nos. 2-132), wherein the virtual machine is a per-process virtual machine.

Example 60

The method of example 58 (as well as any one or more of example nos. 2-132), wherein the virtual machine prevents revealing of the relocated instruction locations.

Example 61

The method of example 58 (as well as any one or more of example nos. 2-132), wherein the virtual machine is a system-level virtual machine.

Example 62

The method of example 39 (as well as any one or more of example nos. 2-132), wherein the arbitrary locations are randomized.

Example 63

The method of example 39 (as well as any one or more of example nos. 2-132), wherein the blocks of instructions are processed by an interpreter.

Example 64

The method of example 39 (as well as any one or more of example nos. 2-132), wherein the blocks of instructions are processed by an execution-time compiler or optimizer.

Example 65

The method of example 39 (as well as any one or more of example nos. 2-132), wherein the blocks of instructions are processed by a simulator or an emulator.

Example 66

The method of example 39 (as well as any one or more of example nos. 2-132), wherein the blocks of instructions are processed by a processing unit.

Example 67

The method of example 39 (as well as any one or more of example nos. 2-132), wherein the blocks of instructions are processed by a binary rewriter.

Example 68

The method of example 39 (as well as any one or more of example nos. 2-132), wherein the blocks of instructions are processed by hardware.

Example 69

The method of example 39 (as well as any one or more of example nos. 2-132), wherein the blocks of instructions are processed in parallel.

Example 70

Includes a method of computer security, the method comprising:
locating each instruction in one or more sets of instructions;
defining in a specification how to relocate each of the instructions to arbitrary locations; and
providing the specification to an output device.

Example 71

The method of example 70 (as well as any one or more of example nos. 2-132), wherein the specification is produced by a compiler, assembler, linker, or loader.

Example 72

The method of example 70 (as well as any one or more of example nos. 2-132), wherein each of the instructions are located by iterating through the contents in one or more files.

Example 73

The method of example 70 (as well as any one or more of example nos. 2-132), further comprising identifying direct branch targets in the instructions.

Example 74

The method of example 70 (as well as any one or more of example nos. 2-132), further comprising identifying potential indirect branch targets in the instructions.

Example 75

The method of example 70 (as well as any one or more of example nos. 2-132), further comprising defining in the specification how to relocate direct branch targets.

Example 76

The method of example 74 (as well as any one or more of example nos. 2-132), further comprising defining in the specification how to relocate each of the potential indirect branch targets.

Example 77

The method of example 70 (as well as any one or more of example nos. 2-132), further comprising identifying functions in the instructions.

Example 78

The method of example 77 (as well as any one or more of example nos. 2-132), further comprising defining in the specification how to store relocated return addresses for each function call of the functions.

Example 79

The method of example 78 (as well as any one or more of example nos. 2-132), further comprising storing the relocated return addresses of the function calls according to the specification.

Example 80

The method of example 70 (as well as any one or more of example nos. 2-132), further comprising inserting each of the instructions into a database after they are located.

Example 81

The method of example 70 (as well as any one or more of example nos. 2-132), wherein the one or more sets of instructions comprise a portion of one or more files.

Example 82

Includes a method of computer security, the method comprising: relocating each instruction in one or more files to arbitrary locations.

Example 83

The method of example 82 (as well as any one or more of example nos. 2-132), wherein the relocating occurs according to a specification, the specification defining how to relocate instructions.

Example 84

The method of example 83 (as well as any one or more of example nos. 2-132), wherein the specification further comprises defining how to relocate direct branch targets.

Example 85

The method of example 83 (as well as any one or more of example nos. 2-132), wherein the specification further comprises defining how to relocate potential indirect branch targets.

Example 86

The method of example 84 (as well as any one or more of example nos. 2-132), further comprising relocating the direct branch targets according to the specification.

Example 87

The method of example 85 (as well as any one or more of example nos. 2-132), further comprising relocating the potential indirect branch targets according to the specification.

Example 88

The method of example 83 (as well as any one or more of example nos. 2-132), wherein the specification further defines how to store relocated return addresses for each function call in the instructions.

Example 89

The method of example 88 (as well as any one or more of example nos. 2-132), further comprising relocating the return addresses for the function calls according to the specification.

Example 90

The method of example 82 (as well as any one or more of example nos. 2-132), wherein the specification defines how to add, modify, and/or remove instructions.

Example 91

The method of example 82 (as well as any one or more of example nos. 2-132), wherein the specification defines the instruction execution sequence.

Example 92

The method of example 82 (as well as any one or more of example nos. 2-132), wherein the specification defines the execution successors of each instruction.

Example 93

The method of example 82 (as well as any one or more of example nos. 2-132), wherein the instructions are processed by a virtual machine.

Example 94

The method of example 93 (as well as any one or more of example nos. 2-132), wherein the virtual machine is a per-process virtual machine.

Example 95

The method of example 93 (as well as any one or more of example nos. 2-132), wherein the virtual machine prevents revealing of the relocated instruction locations.

Example 96

The method of example 93 (as well as any one or more of example nos. 2-132), wherein the virtual machine is a system-level virtual machine.

Example 97

The method of example 82 (as well as any one or more of example nos. 2-132), wherein the arbitrary locations are randomized.

Example 98

The method of example 8 (as well as any one or more of example nos. 2-132)2, wherein the instructions are processed by an interpreter.

Example 99

The method of example 82 (as well as any one or more of example nos. 2-132), wherein the instructions are processed by an execution-time compiler or optimizer.

Example 100

The method of example 82 (as well as any one or more of example nos. 2-132), wherein the instructions are processed by a simulator or an emulator.

Example 101

The method of example 8 (as well as any one or more of example nos.
2-132)2, wherein the instructions are processed by a processing unit.

Example 102

The method of example 82 (as well as any one or more of example nos. 2-132), wherein the instructions are processed by a binary rewriter.

Example 103

The method of example 82 (as well as any one or more of example nos. 2-132), wherein the instructions are processed by hardware.

Example 104

The method of example 82 (as well as any one or more of example nos. 2-132), wherein the instructions are processed in parallel.

Example 105

Includes a method of computer security, the method comprising:
defining in a specification how to relocate each instruction in one or more sets of instructions to arbitrary locations; and
relocating the instructions to arbitrary locations according to the specification.

Example 106

The method of example 105 (as well as any one or more of example nos. 2-132), wherein the specification is produced by a compiler, assembler, linker, or loader.

Example 107

The method of example 105 (as well as any one or more of example nos. 2-132), wherein the specification defines how to add, modify, and/or remove each of the instructions.

Example 108

The method of example 105 (as well as any one or more of example nos. 2-132), wherein the specification defines the locations of non-relocated instructions.

Example 109

The method of example 105 (as well as any one or more of example nos. 2-132), wherein the specification defines the instruction execution sequence.

Example 110

The method of example 105 (as well as any one or more of example nos. 2-132), wherein the specification defines the execution successors of each instruction in each of the instructions.

Example 111

The method of example 105 (as well as any one or more of example nos. 2-132), wherein the set of instructions comprises a portion of one or more files.

Example 112

The method of example 105 (as well as any one or more of example nos. 2-132), further comprising scanning the sets of instructions to identify instructions which should not be relocated.

Example 113

The method of example 105 (as well as any one or more of example nos. 2-132), further comprising scanning the sets of instructions to identify potential indirect branch targets.

Example 114

The method of example 113 (as well as any one or more of example nos. 2-132), wherein the specification further defines rules for relocating the potential indirect branch targets.

Example 115

The method of example 113 (as well as any one or more of example nos. 2-132), further comprising rewriting exception handling tables to contain the locations of the potential indirect branch targets that have been relocated.

Example 116

The method of example 105 (as well as any one or more of example nos. 2-132), wherein the specification further comprises rules for modifying call instructions such that relocated return addresses are stored.

Example 117

The method of example 111 (as well as any one or more of example nos. 2-132), wherein the specification defines transforming the one or more files to include in the one or more files the relocation of the sets of instructions to arbitrary locations.

Example 118

The method of example 111 (as well as any one or more of example nos. 2-132), further comprising encoding the one or more files with the specification.

Example 119

The method of example 105 (as well as any one or more of example nos. 2-132), wherein the relocated blocks of instructions may be re-relocated at any time.

Example 120

The method of example 119 (as well as any one or more of example nos. 2-132), wherein the re-relocation relocates only a portion of the relocated blocks of instructions.

Example 121

The method of example 105 (as well as any one or more of example nos. 2-132), wherein the sets of instructions are processed by a virtual machine.

Example 122

The method of example 121 (as well as any one or more of example nos. 2-132), wherein the virtual machine is a per-process virtual machine.

Example 123

The method of example 121 (as well as any one or more of example nos. 2-132), wherein the virtual machine prevents revealing of the relocated instruction locations.

Example 124

The method of example 105 (as well as any one or more of example nos. 2-132), wherein the virtual machine is a system-level virtual machine.

Example 125

The method of example 105 (as well as any one or more of example nos. 2-132), wherein the arbitrary locations are randomized.

Example 126

The method of example 105 (as well as any one or more of example nos. 2-132), wherein the sets of instructions are processed by an interpreter.

Example 127

The method of example 105 (as well as any one or more of example nos. 2-132), wherein the sets of instructions are processed by an execution-time compiler or optimizer.

Example 128

The method of example 105 (as well as any one or more of example nos. 2-132), wherein the sets of instructions are processed by a simulator or an emulator.

Example 129

The method of example 105 (as well as any one or more of example nos. 2-132), wherein the sets of instructions are processed by a processing unit.

Example 130

The method of example 105 (as well as any one or more of example nos. 2-132), wherein the sets of instructions are processed by a binary rewriter.

Example 131

The method of example 105 (as well as any one or more of example nos. 2-132), wherein the sets of instructions are processed by hardware.

Example 132

The method of example 105 (as well as any one or more of example nos. 2-131), wherein the sets of instructions are processed in parallel.

Example 133

Includes a system for computer security, the system comprising:
an input module to receive blocks of instructions, the blocks of instructions being of an arbitrarily-selectable size;
a processor configured to define in a specification how to relocate the blocks of instructions to arbitrary locations; and
an output module configured to transmit the specification.

Example 134

The system of example 133, further comprising a module for selecting the size of the blocks of instructions.

Example 135

The system of example 133 (as well as any one or more of example nos. 134-254), further comprising memory.

Example 136

The system of example 133 (as well as any one or more of example nos. 134-254), wherein the output module is a storage module, memory, network, or a display.

Example 137

The system of example 133 (as well as any one or more of example nos. 134-254), wherein the processor is further configured to define the instruction execution sequence.

Example 138

The system of example 133 (as well as any one or more of example nos. 134-254), wherein the input module receives one or more files.

Example 139

The system of example 133 (as well as any one or more of example nos. 134-254), wherein the processor is further configured to scan the blocks of instructions to identify potential indirect branch targets.

Example 140

The system of example 139 (as well as any one or more of example nos. 134-254), wherein the processor is further configured to define in the specification rules for relocating the potential indirect branch targets.

Example 141

The system of example 133 (as well as any one or more of example nos. 134-254), wherein the processor is further to define in the specification rules for modifying call instructions such that relocated returns addresses are stored.

Example 142

The system of example 138 (as well as any one or more of example nos. 134-254), wherein the processor is further configured to define in the specification how to transform the one or more files to include in the one or more files the relocation of the blocks of instructions to arbitrary locations in memory.

Example 143

The system of example 133 (as well as any one or more of example nos. 134-254), wherein the processor is further configured to define in the specification how to define in a second specification how to add, modify, and/or remove blocks of instructions.

Example 144

The system of example 138 (as well as any one or more of example nos. 134-254), wherein the processor is further configured to encode the one or more files with the specification.

Example 145

Includes a system for computer security, the system comprising:
an input module to receive blocks of instructions, the blocks of instructions being of an arbitrarily-selectable size;
a processor configured to relocate the blocks of instructions to arbitrary locations; and
an output module configured to send the blocks of instructions.

Example 146

The system of example 145 (as well as any one or more of example nos. 134-254), further comprising a module for selecting the size of the blocks of instructions.

Example 147

The system of example 145 (as well as any one or more of example nos. 134-254), wherein the processor is further configured to relocate the blocks of instructions to arbitrary locations according to a specification.

Example 148

The system of example 147 (as well as any one or more of example nos. 134-254), wherein the specification defines how to add, modify, and/or remove the blocks of instructions.

Example 149

The system of example 147 (as well as any one or more of example nos. 134-254), wherein the specification defines the instruction execution sequence.

Example 150

The system of example 145 (as well as any one or more of example nos. 134-254), wherein the processor may re-relocate the blocks of instructions at any time.

Example 151

The system of example 150 (as well as any one or more of example nos. 134-254), wherein the processor may re-relocate only a portion of the blocks of instructions.

Example 152

The system of example 145 (as well as any one or more of example nos. 134-254), wherein the processor comprises a virtual machine.

Example 153

The system of example 152 (as well as any one or more of example nos. 134-254), wherein the virtual machine is a per-process virtual machine.

Example 154

The system of example 152 (as well as any one or more of example nos. 134-254), wherein the virtual machine prevents revealing of the relocated instruction locations.

Example 155

The system of example 152 (as well as any one or more of example nos. 134-254), wherein the virtual machine is a system-level virtual machine.

Example 156

The system of example 145 (as well as any one or more of example nos. 134-254), wherein the arbitrary locations are randomized.

Example 157

The system of example 145 (as well as any one or more of example nos. 134-254), wherein the processor comprises an interpreter.

Example 158

The system of example 145 (as well as any one or more of example nos. 134-254), wherein the processor comprises an execution-time compiler or optimizer.

Example 159

The system of example 145 (as well as any one or more of example nos. 134-254), wherein the processor comprises a simulator.

Example 160

The system of example 145 (as well as any one or more of example nos. 134-254), wherein the processor comprises an interpreter.

Example 161

The system of example 145, (as well as any one or more of example nos. 134-254) wherein the processor comprises an emulator.

Example 162

The system of example 145 (as well as any one or more of example nos. 134-254), wherein the processor comprises a binary rewriter.

Example 163

The system of example 145 (as well as any one or more of example nos. 134-254), wherein the processor can operate in parallel.

Example 164

The system of example 145 (as well as any one or more of example nos. 134-254), wherein the processor is a hardware processor.

Example 165

Includes a system for computer security, the system comprising:
an input module to receive blocks of instructions, the blocks of instructions being of an arbitrarily-selectable size;
a processor configured to:
define in a specification how to relocate the blocks of instructions to arbitrary locations; and
relocate the blocks of instructions according to the specification; and
an output module to send the blocks of instructions to the arbitrary locations.

Example 166

The system of example 165 (as well as any one or more of example nos. 134-254), further comprising a module for selecting the size of the blocks of instructions.

Example 167

The system of example 165 (as well as any one or more of example nos. 134-254), further comprising a compiler, assembler, linker, or loader.

Example 168

The system of example 165 (as well as any one or more of example nos. 134-254), wherein the processor is further configured to define in the specification how to add, modify, and/or remove the blocks of instructions.

Example 169

The system of example 165 (as well as any one or more of example nos. 134-254), wherein the processor is further configured to define in the specification the locations of non-relocated instructions.

Example 170

The system of example 165 (as well as any one or more of example nos. 134-254), wherein the processor is further configured to define the execution successors of each instruction in the blocks of instructions.

Example 171

The system of example 165 (as well as any one or more of example nos. 134-254), further comprising one or more files.

Example 172

The system of example 165 (as well as any one or more of example nos. 134-254), wherein the processor is further configured to scan the blocks of instructions to identify instructions which should not be relocated.

Example 173

The system of example 172 (as well as any one or more of example nos. 134-254), wherein the processor is configured to further define in the specification rules for relocating the potential indirect branch targets.

Example 174

The system of example 165 (as well as any one or more of example nos. 134-254), wherein the processor is further configured to scan the blocks of instructions to identify potential indirect branch targets.

Example 175

The system of example 174 (as well as any one or more of example nos. 134-254), wherein the processor is further configured to define in the specification rules for relocating the potential indirect branch targets.

Example 176

The system of example 175 (as well as any one or more of example nos. 134-254), wherein the processor is further configured to rewrite exception handling tables to contain the locations of the potential indirect branch targets.

Example 177

The system of example 165 (as well as any one or more of example nos. 134-254), wherein the processor is further configured to define in the specification rules for modifying call instructions such that relocated return addresses are stored.

Example 178

The system of example 171 (as well as any one or more of example nos. 134-254), wherein the processor is further configured to define in the specification how to transform the one or more files to include in the one or more files the relocation of the blocks of instructions to arbitrary locations.

Example 179

The system of example 171 (as well as any one or more of example nos. 134-254), wherein the processor is further configured to define in the specification how to re-relocate the blocks of instructions at any time.

Example 180

The system of example 165 (as well as any one or more of example nos. 134-254), wherein the process is further configured to define in the specification how to re-relocate a portion of the blocks of instructions at any time.

Example 181

The system of example 165 (as well as any one or more of example nos. 134-254), further comprising a virtual machine.

Example 182

The system of example 181 (as well as any one or more of example nos. 134-254), wherein the virtual machine is a per-process virtual machine.

Example 183

The system of example 181 (as well as any one or more of example nos. 134-254), wherein the virtual machine prevents revealing of the relocated instruction locations.

Example 184

The system of example 181 (as well as any one or more of example nos. 134-254), wherein the virtual machine is a system-level virtual machine.

Example 185

The system of example 165 (as well as any one or more of example nos. 134-254), wherein the processor comprises an interpreter.

Example 186

The system of example 165 (as well as any one or more of example nos. 134-254), wherein the processor comprises an execution-time compiler or optimizer.

Example 187

The system of example 165 (as well as any one or more of example nos. 134-254), wherein the processor comprises a simulator.

Example 188

The system of example 165 (as well as any one or more of example nos. 134-254), wherein the processor comprises an emulator.

Example 189

The system of example 165 (as well as any one or more of example nos. 134-254), wherein the processor comprises a binary rewriter.

Example 190

The system of example 165 (as well as any one or more of example nos. 134-254), wherein the processor can operate in parallel.

Example 191

The system of example 165 (as well as any one or more of example nos. 134-254), wherein the processor is a hardware processor.

Example 192

Includes a system for computer security, the system comprising:
an input module to receive one or more sets of instructions;
a processor configured to:
locate each instruction in one or more sets of instructions;
define in a specification how to relocate each of the instructions to arbitrary locations; and
an output module to transmit the specification.

Example 193

The system of example 192 (as well as any one or more of example nos. 134-254), further comprising a compiler, assembler, linker, or loader.

Example 194

The system of example 192 (as well as any one or more of example nos. 134-254), further comprising one or more files.

Example 195

The system of example 194 (as well as any one or more of example nos. 134-254), wherein the processor is further configure to locate the instructions by iterating through the contents of the one or more files.

Example 196

The system of example 192 (as well as any one or more of example nos. 134-254), wherein the processor is further configured to identify direct branch targets in the instructions.

Example 197

The system of example 192 (as well as any one or more of example nos. 134-254), wherein the processor is further configured to identify potential indirect branch targets in the instructions.

Example 198

The system of example 192 (as well as any one or more of example nos. 134-254), wherein the processor is further configured to define in the specification how to relocate direct branch targets.

Example 199

The system of example 197 (as well as any one or more of example nos. 134-254), wherein the processor is further configured to define in the specification how to relocate each of the potential indirect branch targets.

Example 200

The system of example 192 (as well as any one or more of example nos. 134-254), wherein the processor is further configured to identify functions in the instructions.

Example 201

The system of example 200 (as well as any one or more of example nos. 134-254), wherein the processor is further configured to define in the specification how to store relocated return address for each function call of the functions.

Example 202

The system of example 201 (as well as any one or more of example nos. 134-254), wherein the processor is further configured to insert each of the instructions into a database after they are located.

Example 203

The system of example 192 (as well as any one or more of example nos. 134-254), wherein the one or more sets of instructions comprise a portion of one or more files.

Example 204

Includes a system for computer security, the system comprising:
  an input module to receive the one or more files;
  a processor configured to relocate each instruction in the one or more files to arbitrary locations; and
  an output module to send the instructions to the arbitrary locations.

Example 205

The system of example 204 (as well as any one or more of example nos. 134-254), wherein the processor is further configured to relocate each of the instructions according to a specification.

Example 206

The system of example 205 (as well as any one or more of example nos. 134-254), wherein the specification further comprises defining how to relocate direct branch targets.

Example 207

The system of example 205 (as well as any one or more of example nos. 134-254), wherein the specification further comprises defining how to relocate potential indirect branch targets.

Example 208

The system of example 206 (as well as any one or more of example nos. 134-254), wherein the processor is further configured to relocate direct branch targets according to the specification.

Example 209

The system of example 207 (as well as any one or more of example nos. 134-254), wherein the processor is further configured to relocate potential indirect branch targets according to the specification.

Example 210

The system of example 205, (as well as any one or more of example nos. 134-254) wherein the specification further defines how to store relocated return addresses for each function call in the instructions.

Example 211

The system of example 210 (as well as any one or more of example nos. 134-254), wherein the processor is further configured to relocate return addresses for function calls according to the specification.

Example 212

The system of example 205 (as well as any one or more of example nos. 134-254), wherein the specification further defines how to add, modify, and/or remove instructions.

Example 213

The system of example 205 (as well as any one or more of example nos. 134-254), wherein the specification further defines the instruction execution sequence.

Example 214

The system of example 205 (as well as any one or more of example nos. 134-254), wherein the specification further defines the execution successors of each instruction.

Example 215

The system of example 204 (as well as any one or more of example nos. 134-254), further comprising a virtual machine.

Example 216

The system of example 212 (as well as any one or more of example nos. 134-254), wherein the virtual machine is a per-process virtual machine.

Example 217

The system of example 212 (as well as any one or more of example nos. 134-254), wherein the virtual machine prevents revealing of the relocated instruction locations.

Example 218

The system of example 212 (as well as any one or more of example nos. 134-254), wherein the virtual machine is a system-level virtual machine.

Example 219

The system of example 204 (as well as any one or more of example nos. 134-254), wherein the processor is further configured to randomize the arbitrary locations.

Example 220

The system of example 204 (as well as any one or more of example nos. 134-254), wherein the processor comprises an interpreter.

Example 221

The system of example 204 (as well as any one or more of example nos. 134-254), wherein the processor comprises an execution-time compiler or optimizer.

Example 222

The system of example 204 (as well as any one or more of example nos. 134-254), wherein the processor comprises a simulator.

Example 223

The system of example 204 (as well as any one or more of example nos. 134-254), wherein the processor comprises an emulator.

Example 224

The system of example 204 (as well as any one or more of example nos. 134-254), wherein the processor comprises a binary rewriter.

Example 225

The system of example 204 (as well as any one or more of example nos. 134-254), wherein the processor can operate in parallel.

Example 226

The system of example 204 (as well as any one or more of example nos. 134-254), wherein the processor is a hardware processor.

Example 227

Includes a system for computer security, the system comprising:
an input module to receive one or more sets of instructions;
a processor configured to:
define in a specification how to relocate each instruction in the one or more sets of instructions to arbitrary locations; and
relocate the instructions to arbitrary locations according to the specification; and
an output module to send the instructions to the arbitrary locations.

Example 228

The system of example 227 (as well as any one or more of example nos. 134-254), further comprising a compiler, assembler, linker, or loader.

Example 229

The system of example 228 (as well as any one or more of example nos. 134-254), wherein the specification is produced by the compiler, assembler, linker, or loader.

Example 230

The system of example 227 (as well as any one or more of example nos. 134-254), wherein the processor is further configured to define in the specification how to add, modify, and/or remove each of the instructions.

Example 231

The system of example 227 (as well as any one or more of example nos. 134-254), wherein the processor is further configured to define in the specification the locations of non-relocated instructions.

Example 232

The system of example 227 (as well as any one or more of example nos. 134-254), wherein the processor is further configured to define in the specification the instruction execution sequence.

Example 233

The system of example 227 (as well as any one or more of example nos. 134-254), wherein the processor is further configured to scan the sets of instructions to identify instructions which should not be relocated.

Example 234

The system of example 227 (as well as any one or more of example nos. 134-254), wherein the processor is further configured to scan the sets of instructions to identify potential indirect branch targets.

Example 235

The system of example 234 (as well as any one or more of example nos. 134-254), wherein the processor is further configured to define in the specification rules for relocating the potential indirect branch targets.

Example 236

The system of example 234 (as well as any one or more of example nos. 134-254), wherein the processor is further configured to rewrite exception handling tables to contain the locations of the potential indirect branch targets that have been relocated.

Example 237

The system of example 227 (as well as any one or more of example nos. 134-254), wherein the processor is further configured to define in the specification rules for modifying call instructions such that relocated return addresses are stored.

Example 238

The system of example 22 (as well as any one or more of example nos. 134-254)7, wherein the sets of instructions comprise a portion of one or more files.

Example 239

The system of example 238 (as well as any one or more of example nos. 134-254), wherein the processor is further configured to define in the specification transforming the one or more files to include in the one or more files the relocation of the sets of instructions to arbitrary locations.

Example 240

The system of example 238 (as well as any one or more of example nos. 134-254), wherein the processor is further configured to encode the one or more files with the specification.

Example 241

The system of example 227 (as well as any one or more of example nos. 134-254), wherein the processor is configured to define in the specification rules for re-relocating instructions.

Example 242

The system of example 241 (as well as any one or more of example nos. 134-254), wherein the processor is configured to re-relocate instructions at any time according to the specification.

Example 243

The system of example 227 (as well as any one or more of example nos. 134-254), further comprising a virtual machine.

Example 244

The system of example 243 (as well as any one or more of example nos. 134-254), wherein the virtual machine is a system-level virtual machine.

Example 245

The system of example 243 (as well as any one or more of example nos. 134-254), wherein the virtual machine is a per-process virtual machine.

Example 246

The system of example 243 (as well as any one or more of example nos. 134-254), wherein the virtual machine prevents revealing of the relocated instruction locations.

Example 247

The system of example 227 (as well as any one or more of example nos. 134-254), wherein the processor is further configured to randomize the arbitrary locations.

Example 248

The system of example 227 (as well as any one or more of example nos. 134-254), wherein the processor comprises an interpreter.

Example 249

The system of example 227 (as well as any one or more of example nos. 134-254), wherein the processor comprises an execution-time compiler or optimizer.

Example 250

The system of example 227 (as well as any one or more of example nos. 134-254), wherein the processor comprises a simulator.

Example 251

The system of example 227 (as well as any one or more of example nos. 134-254), wherein the processor comprises an emulator.

Example 252

The system of example 227 (as well as any one or more of example nos. 134-254), wherein the processor comprises a binary rewriter.

Example 253

The system of example 227 (as well as any one or more of example nos. 134-254), wherein the processor can operate in parallel.

Example 254

The system of example 22 (as well as any one or more of example nos. 134-253)7, wherein the processor is a hardware processor.

Example 255

Includes a non-transitory computer readable medium containing program instructions for providing computer security, wherein execution of the program instructions by one or more processors of a computer system causes the processor to carry out the following steps of:

defining in a specification how to relocate blocks of instructions to arbitrary locations, the blocks of instructions being of an arbitrarily-selectable size; and providing the specification to an output device.

Example 256

The computer readable medium of example 255, wherein the arbitrarily-selectable size is selected by a human, by a computer algorithm, and/or by random selection.

Example 257

The computer readable medium of example 255 (as well as any one or more of example nos. 256-386), wherein the specification is produced by a compiler, assembler, linker, or loader.

Example 258

The computer readable medium of example 255 (as well as any one or more of example nos. 256-386), wherein the output device includes storage, memory, network, or a display.

Example 259

The computer readable medium of example 25 (as well as any one or more of example nos. 256-386)5, wherein the specification defines how to add, modify, and/or remove the blocks of instructions.

Example 260

The computer readable medium of example 255 (as well as any one or more of example nos. 256-386), wherein the specification defines the locations of non-relocated instructions.

Example 261

The computer readable medium of example 255 (as well as any one or more of example nos. 256-386), wherein the specification defines the instruction execution sequence.

Example 262

The computer readable medium of example 255 (as well as any one or more of example nos. 256-386), wherein the specification defines the execution successors of each instruction in the blocks of instructions.

Example 263

The computer readable medium of example 255 (as well as any one or more of example nos. 256-386), wherein the blocks of instructions are contained in one or more files.

Example 264

The computer readable medium of example 263 (as well as any one or more of example nos. 256-386), wherein the blocks of instructions comprise only a portion of the one or more files.

Example 265

The computer readable medium of example 255 (as well as any one or more of example nos. 256-386), further comprising scanning the blocks of instructions to identify instructions which should not be relocated.

Example 266

The computer readable medium of example 265 (as well as any one or more of example nos. 256-386), wherein the scanning identifies potential indirect branch targets.

Example 267

The computer readable medium of example 255 (as well as any one or more of example nos. 256-386), further comprising scanning the blocks of instructions to identify potential indirect branch targets.

Example 268

The computer readable medium of example 267 (as well as any one or more of example nos. 256-386), wherein the specification further defines rules for relocating the potential indirect branch targets.

Example 269

The computer readable medium of example 268 (as well as any one or more of example nos. 256-386), further comprising rewriting exception handling tables to contain the locations of the potential indirect branch targets that have been relocated.

Example 270

The computer readable medium of example 255 (as well as any one or more of example nos. 256-386), wherein the specification further comprises rules for modifying call instructions such that relocated return addresses are stored.

Example 271

The computer readable medium of example 263 (as well as any one or more of example nos. 256-386), wherein the specification defines transforming the one or more files to include in the one or more files the relocation of the blocks of instructions to arbitrary locations.

Example 272

The computer readable medium of example 255 (as well as any one or more of example nos. 256-386), wherein the specification further defines in a second specification how to add, modify, and/or remove blocks of instructions.

Example 273

The computer readable medium of example 263 (as well as any one or more of example nos. 256-386), further comprising encoding the one or more files with the specification.

Example 274

Includes a non-transitory computer readable medium containing program instructions for providing computer security, wherein execution of the program instructions by one or more processors of a computer system causes the processor to carry out the following steps of:

relocating blocks of instructions to arbitrary locations, the blocks of instructions being of an arbitrarily-selectable size.

Example 275

The computer readable medium of example 274 (as well as any one or more of example nos. 256-386), wherein the relocation occurs according to a specification, the specification defining how to relocate the blocks of instructions.

Example 276

The computer readable medium of example 275 (as well as any one or more of example nos. 256-386), wherein the specification defines how to add, modify, and/or remove the blocks of instructions.

Example 277

The computer readable medium of example 275 (as well as any one or more of example nos. 256-386), wherein the specification defines the instruction execution sequence.

Example 278

The computer readable medium of example 275 (as well as any one or more of example nos. 256-386), wherein the specification defines the execution successors of each instruction.

Example 279

The computer readable medium of example 274 (as well as any one or more of example nos. 256-386), wherein the relocated blocks of instructions may be re-relocated at any time.

Example 280

The computer readable medium of example 279 (as well as any one or more of example nos. 256-386), wherein the re-relocation relocates only a portion of the relocated blocks of instructions.

Example 281

The computer readable medium of example 274 (as well as any one or more of example nos. 256-386), wherein the blocks of instructions are processed by a virtual machine.

Example 282

The computer readable medium of example 281 (as well as any one or more of example nos. 256-386), wherein the virtual machine is a per-process virtual machine.

Example 283

The computer readable medium of example 281 (as well as any one or more of example nos. 256-386), wherein the virtual machine prevents revealing of the relocated instruction locations.

Example 284

The computer readable medium of example 281 (as well as any one or more of example nos. 256-386), wherein the virtual machine is a system-level virtual machine.

Example 285

The computer readable medium of example 274 (as well as any one or more of example nos. 256-386), wherein the arbitrary locations are randomized.

Example 286

The computer readable medium of example 274 (as well as any one or more of example nos. 256-386), wherein the blocks of instructions are processed by an interpreter.

Example 287

The computer readable medium of example 274 (as well as any one or more of example nos. 256-386), wherein the blocks of instructions are processed by an execution-time compiler or optimizer.

Example 288

The computer readable medium of example 274 (as well as any one or more of example nos. 256-386), wherein the blocks of instructions are processed by a simulator or an emulator.

Example 289

The computer readable medium of example 274 (as well as any one or more of example nos. 256-386), wherein the blocks of instructions are processed by a processing unit.

Example 290

The computer readable medium of example 274 (as well as any one or more of example nos. 256-386), wherein the blocks of instructions are processed by a binary rewriter.

Example 291

The computer readable medium of example 274 (as well as any one or more of example nos. 256-386), wherein the blocks of instructions are processed by hardware.

Example 292

The computer readable medium of example 274 (as well as any one or more of example nos. 256-386), wherein the blocks of instructions are processed in parallel.

Example 293

Includes a non-transitory computer readable medium containing program instructions for providing computer security, wherein execution of the program instructions by one or more processors of a computer system causes the processor to carry out the following steps of:

defining in a specification how to relocate blocks of instructions to arbitrary locations, the blocks of instructions being of an arbitrarily-selectable size; and relocating blocks of instructions according to the specification.

Example 294

The computer readable medium of example 293 (as well as any one or more of example nos. 256-386), wherein the arbitrarily-selectable size is selected by a human, by a computer algorithm, and/or by random selection.

Example 295

The computer readable medium of example 293 (as well as any one or more of example nos. 256-386), wherein the specification is produced by a compiler, assembler, linker, or loader.

Example 296

The computer readable medium of example 293 (as well as any one or more of example nos. 256-386), wherein the specification defines how to add, modify, and/or remove the blocks of instructions.

Example 297

The computer readable medium of example 293 (as well as any one or more of example nos. 256-386), wherein the specification defines the locations of non-relocated instructions.

Example 298

The computer readable medium of example 293 (as well as any one or more of example nos. 256-386), wherein the specification defines the instruction execution sequence.

Example 299

The computer readable medium of example 293 (as well as any one or more of example nos. 256-386), wherein the specification defines the execution successors of each instruction in the blocks of instructions.

Example 300

The computer readable medium of example 293, wherein the blocks of instructions are contained in one or more files.

Example 301

The computer readable medium of example 293 (as well as any one or more of example nos. 256-386), wherein the blocks of instructions comprise only a portion of the one or more files.

Example 302

The computer readable medium of example 293 (as well as any one or more of example nos. 256-386), further comprising scanning the blocks of instructions to identify instructions which should not be relocated.

Example 303

The computer readable medium of example 293 (as well as any one or more of example nos. 256-386), further comprising scanning the blocks of instructions to identify potential indirect branch targets.

Example 304

The computer readable medium of example 303 (as well as any one or more of example nos. 256-386), wherein the specification further defines rules for relocating the potential indirect branch targets.

Example 305

The computer readable medium of example 304 (as well as any one or more of example nos. 256-386), further comprising rewriting exception handling tables to contain the locations of the potential indirect branch targets that have been relocated.

Example 306

The computer readable medium of example 293 (as well as any one or more of example nos. 256-386), wherein the specification further comprises rules for modifying call instructions such that relocated return addresses are stored.

Example 307

The computer readable medium of example 300 (as well as any one or more of example nos. 256-386), wherein the specification defines transforming the one or more files to include in the one or more files the relocation of the blocks of instructions to arbitrary locations.

Example 308

The computer readable medium of example 293 (as well as any one or more of example nos. 256-386), wherein the specification further defines how to add, modify, and/or remove blocks of instructions in a second specification.

Example 309

The computer readable medium of example 300 (as well as any one or more of example nos. 256-386), further comprising encoding the one or more files with the specification.

Example 310

The computer readable medium of example 293 (as well as any one or more of example nos. 256-386), wherein the relocated blocks of instructions may be re-relocated at any time.

Example 311

The computer readable medium of example 310 (as well as any one or more of example nos. 256-386), wherein the re-relocation relocates only a portion of the relocated blocks of instructions.

Example 312

The computer readable medium of example 293 (as well as any one or more of example nos. 256-386), wherein the blocks of instructions are processed by a virtual machine.

Example 313

The computer readable medium of example 312 (as well as any one or more of example nos. 256-386), wherein the virtual machine is a per-process virtual machine.

Example 314

The computer readable medium of example 312 (as well as any one or more of example nos. 256-386), wherein the virtual machine prevents revealing of the relocated instruction locations.

Example 315

The computer readable medium of example 312 (as well as any one or more of example nos. 256-386), wherein the virtual machine is a system-level virtual machine.

Example 316

The computer readable medium of example 293 (as well as any one or more of example nos. 256-386), wherein the arbitrary locations are randomized.

Example 317

The computer readable medium of example 293 (as well as any one or more of example nos. 256-386), wherein the blocks of instructions are processed by an interpreter.

Example 318

The computer readable medium of example 293 (as well as any one or more of example nos. 256-386), wherein the blocks of instructions are processed by an execution-time compiler or optimizer.

Example 319

The computer readable medium of example 293 (as well as any one or more of example nos. 256-386), wherein the blocks of instructions are processed by a simulator or an emulator.

Example 320

The computer readable medium of example 293 (as well as any one or more of example nos. 256-386), wherein the blocks of instructions are processed by a processing unit.

Example 321

The computer readable medium of example 293 (as well as any one or more of example nos. 256-386), wherein the blocks of instructions are processed by a binary rewriter.

Example 322

The computer readable medium of example 293 (as well as any one or more of example nos. 256-386), wherein the blocks of instructions are processed by hardware.

Example 323

The computer readable medium of example 293 (as well as any one or more of example nos. 256-386), wherein the blocks of instructions are processed in parallel.

Example 324

Includes a non-transitory computer readable medium containing program instructions for providing computer security, wherein execution of the program instructions by one or more processors of a computer system causes the processor to carry out the following steps of:
  locating each instruction in one or more sets of instructions;
  defining in a specification how to relocate each of the instructions to arbitrary locations; and
  providing the specification to an output device.

Example 325

The computer readable medium of example 324 (as well as any one or more of example nos. 256-386), wherein the specification is produced by a compiler, assembler, linker, or loader.

Example 326

The computer readable medium of example 324 (as well as any one or more of example nos. 256-386), wherein each of the instructions are located by iterating through the contents in one or more files.

Example 327

The computer readable medium of example 324 (as well as any one or more of example nos. 256-386), further comprising identifying direct branch targets in the instructions.

Example 328

The computer readable medium of example 324 (as well as any one or more of example nos. 256-386), further comprising identifying potential indirect branch targets in the instructions.

Example 329

The computer readable medium of example 324 (as well as any one or more of example nos. 256-386), further comprising defining in the specification how to relocate direct branch targets.

Example 330

The computer readable medium of example 328 (as well as any one or more of example nos. 256-386), further comprising defining in the specification how to relocate each of the potential indirect branch targets.

Example 331

The computer readable medium of example 324 (as well as any one or more of example nos. 256-386), further comprising identifying functions in the instructions.

Example 332

The computer readable medium of example 331 (as well as any one or more of example nos. 256-386), further comprising defining in the specification how to store relocated return addresses for each function call of the functions.

Example 333

The computer readable medium of example 332 (as well as any one or more of example nos. 256-386), further comprising storing the relocated return addresses of the function calls according to the specification.

Example 334

The computer readable medium of example 324 (as well as any one or more of example nos. 256-386), further comprising inserting each of the instructions into a database after they are located.

Example 335

The computer readable medium of example 324 (as well as any one or more of example nos. 256-386), wherein the one or more sets of instructions comprise a portion of one or more files.

Example 336

Includes a non-transitory computer readable medium containing program instructions for providing computer security, wherein execution of the program instructions by one or more processors of a computer system causes the processor to carry out the following steps of:
 relocating each instruction in one or more files to arbitrary locations.

Example 337

The computer readable medium of example 336 (as well as any one or more of example nos. 256-386), wherein the relocating occurs according to a specification, the specification defining how to relocate instructions.

Example 338

The computer readable medium of example 337 (as well as any one or more of example nos. 256-386), wherein the specification further comprises defining how to relocate direct branch targets.

Example 339

The computer readable medium of example 337 (as well as any one or more of example nos. 256-386), wherein the specification further comprises defining how to relocate potential indirect branch targets.

Example 340

The computer readable medium of example 338 (as well as any one or more of example nos. 256-386), further comprising relocating the direct branch targets according to the specification.

Example 341

The computer readable medium of example 339 (as well as any one or more of example nos. 256-386), further comprising relocating the potential indirect branch targets according to the specification.

Example 342

The computer readable medium of example 337 (as well as any one or more of example nos. 256-386), wherein the specification further defines how to store relocated return addresses for each function call in the instructions.

Example 343

The computer readable medium of example 342 (as well as any one or more of example nos. 256-386), further comprising relocating the return addresses for the function calls according to the specification.

Example 344

The computer readable medium of example 336 (as well as any one or more of example nos. 256-386), wherein the specification defines how to add, modify, and/or remove instructions.

Example 345

The computer readable medium of example 336 (as well as any one or more of example nos. 256-386), wherein the specification defines the instruction execution sequence.

Example 346

The computer readable medium of example 336 (as well as any one or more of example nos. 256-386), wherein the specification defines the execution successors of each instruction.

Example 347

The computer readable medium of example 336 (as well as any one or more of example nos. 256-386), wherein the instructions are processed by a virtual machine.

Example 348

The computer readable medium of example 347 (as well as any one or more of example nos. 256-386), wherein the virtual machine is a per-process virtual machine.

Example 349

The computer readable medium of example 347 (as well as any one or more of example nos. 256-386), wherein the virtual machine prevents revealing of the relocated instruction locations.

Example 350

The computer readable medium of example 347 (as well as any one or more of example nos. 256-386), wherein the virtual machine is a system-level virtual machine.

Example 351

The computer readable medium of example 336 (as well as any one or more of example nos. 256-386), wherein the arbitrary locations are randomized.

Example 352

The computer readable medium of example 336 (as well as any one or more of example nos. 256-386), wherein the instructions are processed by an interpreter.

Example 353

The computer readable medium of example 336 (as well as any one or more of example nos. 256-386), wherein the instructions are processed by an execution-time compiler or optimizer.

Example 354

The computer readable medium of example 336 (as well as any one or more of example nos. 256-386), wherein the instructions are processed by a simulator or an emulator.

Example 355

The computer readable medium of example 336 (as well as any one or more of example nos. 256-386), wherein the instructions are processed by a processing unit.

Example 356

The computer readable medium of example 336 (as well as any one or more of example nos. 256-386), wherein the instructions are processed by a binary rewriter.

Example 357

The computer readable medium of example 336 (as well as any one or more of example nos. 256-386), wherein the instructions are processed by hardware.

Example 358

The computer readable medium of example 336 (as well as any one or more of example nos. 256-386), wherein the instructions are processed in parallel.

Example 359

Includes a non-transitory computer readable medium containing program instructions for providing computer security, wherein execution of the program instructions by one or more processors of a computer system causes the processor to carry out the following steps of:
defining in a specification how to relocate each instruction in one or more sets of instructions to arbitrary locations; and
relocating the instructions to arbitrary locations according to the specification.

Example 360

The computer readable medium of example 359 (as well as any one or more of example nos. 256-386), wherein the specification is produced by a compiler, assembler, linker, or loader.

Example 361

The computer readable medium of example 35 (as well as any one or more of example nos. 256-386)9, wherein the specification defines how to add, modify, and/or remove each of the instructions.

Example 362

The computer readable medium of example 359 (as well as any one or more of example nos. 256-386), wherein the specification defines the locations of non-relocated instructions.

Example 363

The computer readable medium of example 359 (as well as any one or more of example nos. 256-386), wherein the specification defines the instruction execution sequence.

Example 364

The computer readable medium of example 359 (as well as any one or more of example nos. 256-386), wherein the specification defines the execution successors of each instruction in each of the instructions.

Example 365

The computer readable medium of example 359 (as well as any one or more of example nos. 256-386), wherein the set of instructions comprises a portion of one or more files.

Example 366

The computer readable medium of example 359 (as well as any one or more of example nos. 256-386), further comprising scanning the sets of instructions to identify instructions which should not be relocated.

Example 367

The computer readable medium of example 359 (as well as any one or more of example nos. 256-386), further comprising scanning the sets of instructions to identify potential indirect branch targets.

Example 368

The computer readable medium of example 367 (as well as any one or more of example nos. 256-386), wherein the specification further defines rules for relocating the potential indirect branch targets.

Example 369

The computer readable medium of example 367 (as well as any one or more of example nos. 256-386), further comprising rewriting exception handling tables to contain the locations of the potential indirect branch targets that have been relocated.

Example 370

The computer readable medium of example 359 (as well as any one or more of example nos. 256-386), wherein the specification further comprises rules for modifying call instructions such that relocated return addresses are stored.

Example 371

The computer readable medium of example 365 (as well as any one or more of example nos. 256-386), wherein the specification defines transforming the one or more files to include in the one or more files the relocation of the sets of instructions to arbitrary locations.

Example 372

The computer readable medium of example 365 (as well as any one or more of example nos. 256-386), further comprising encoding the one or more files with the specification.

Example 373

The computer readable medium of example 359 (as well as any one or more of example nos. 256-386), wherein the relocated blocks of instructions may be re-relocated at any time.

Example 374

The computer readable medium of example 373 (as well as any one or more of example nos. 256-386), wherein the re-relocation relocates only a portion of the relocated blocks of instructions.

Example 375

The computer readable medium of example 359 (as well as any one or more of example nos. 256-386), wherein the sets of instructions are processed by a virtual machine.

Example 376

The computer readable medium of example 375 (as well as any one or more of example nos. 256-386), wherein the virtual machine is a per-process virtual machine.

Example 377

The computer readable medium of example 375 (as well as any one or more of example nos. 256-386), wherein the virtual machine prevents revealing of the relocated instruction locations.

Example 378

The computer readable medium of example 35 (as well as any one or more of example nos. 256-386)9, wherein the virtual machine is a system-level virtual machine.

Example 379

The computer readable medium of example 359 (as well as any one or more of example nos. 256-386), wherein the arbitrary locations are randomized.

Example 380

The computer readable medium of example 359 (as well as any one or more of example nos. 256-386), wherein the sets of instructions are processed by an interpreter.

Example 381

The computer readable medium of example 359 (as well as any one or more of example nos. 256-386), wherein the sets of instructions are processed by an execution-time compiler or optimizer.

Example 382

The computer readable medium of example 359 (as well as any one or more of example nos. 256-386), wherein the sets of instructions are processed by a simulator or an emulator.

Example 383

The computer readable medium of example 359 (as well as any one or more of example nos. 256-386), wherein the sets of instructions are processed by a processing unit.

Example 384

The computer readable medium of example 359 (as well as any one or more of example nos. 256-386), wherein the sets of instructions are processed by a binary rewriter.

Example 385

The computer readable medium of example 359 (as well as any one or more of example nos. 256-386), wherein the sets of instructions are processed by hardware.

Example 386

The computer readable medium of example 359 (as well as any one or more of example nos. 256-385), wherein the sets of instructions are processed in parallel.

REFERENCES

The modules, components, devices, systems, computer readable media, algorithms and methods of various embodiments of the invention disclosed herein may utilize aspects disclosed in the following references, applications, publications and patents and which are hereby incorporated by reference herein in their entirety (and which are not admitted to be prior art with respect to the present invention by inclusion in this section):

1. U.S. patent application Ser. No. 12/809,627 entitled "System, Method and Computer Program Product for Protecting Software Via Continuous Anti-Tampering and Obfuscation Transforms," filed Jun. 21, 2010; U.S. Patent Application Publication No. 2011/0035601, Feb. 10, 2011.

2. International Patent Application No. PCT/US2008/087712 entitled "System, Method and Computer Program Product for Protecting Software Via Continuous Anti-Tampering and Obfuscation Transforms," filed Dec. 19, 2008.

3. U.S. patent application Ser. No. 11/995,272 entitled "Method and System for Software Protection Using Binary Encoding," filed Feb. 29, 2008.

4. International Patent Application No. US2006/026932 entitled "Method and System for Software Protection Using Binary Encoding," filed Jul. 11, 2006.

5. U.S. Pat. No. 7,831,791 B2, Miller, et al., entitled "Method of Address Space Layout Randomization for Windows Operating Systems", Nov. 9, 2010.

6. U.S. Patent Application Publication No. 2011/0191848 A1, Zorn, et al., entitled "Preventing Malicious Just-In-Time Spraying Attacks", Aug. 4, 2011.

7. U.S. Patent Application Publication No. 2008/0040607, A1, Kaabouch, et al., entitled "Software Execution Randomization", Feb. 14, 2008.

8. U.S. Patent Application Publication No. 2008/0016314 A1, Li, et al., entitled "Diversity-Based Security System and Method", Jan. 17, 2008.

9. U.S. Pat. No. 7,802,132, Zorn, et al., entitled "Software Robustness Through Search for Robust Runtime Implementations", Sep. 21, 2010.

10. U.S. Pat. No. 7,430,670 B1, Horning, et al., entitled "Software Self-Defense Systems and Methods", Sep. 30, 2008.

11. Wartell, R., et al., "Binary Stirring: Self-randomizing instruction Addresses of Legacy x86 Binary Code", CCS 12, Oct. 16-18, 2012, Raleigh, N.C.

12. Pappas, V., et al., "Smashing Gadgets: Hindering Return-Oriented Programming Using In-Place Code Randomization", 2012 IEEE Symposium, pages 601-605.

13. Hiser, J., et al., "ILR: Where'd My Gadgets Go?", 2012 IEEE Symposium, pages 571-585.

14. U.S. Patent Application Publication No. 2011/0145472 A1, Whitehouse, et al., "Method for Address Space Layout Randomization in Execute-In-Place Code", Jun. 16, 2011.

15. U.S. Pat. No. 5,133,061, Melton, et al., "Mechanism for Improving the Randomization of Cache Accesses Utilizing Abit-Matrix Multiplication Permutation of Cache Addresses", Jul. 21, 1992.

16. U.S. Pat. No. 5,276,826, Rau, et al., "Apparatus for Transforming Addresses to Provide Peudo-Random Access to Memory Modules", Jan. 4, 1994.

17. U.S. Pat. No. 5,897,662, Corrigan, et al., "Pseudo-Random Address Generation Mechanism That Reduces Address Translation Time", Apr. 27, 1999.

18. U.S. Pat. No. 7,546,430, Miller, et al., Method of Address Space Layout Randomization for Windows Operating Systems", Jun. 9, 2009.

19. U.S. Pat. No. 7,779,216, Souders, et al., "Method and System of Randomizing Memory Locations", Aug. 17, 2010.

20. U.S. Pat. No. 8,171,256, Satish, et al., "Systems and Methods for Preventing Subversion of Address Space Layout Randomization (ASLR), May 1, 2012.

21. U.S. Pat. No. 8,195,957, Dolgunov, et al., "Memory Randomization for Protection Against Side Channel Attacks", Jun. 5, 2012.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A system for computer security that defines a specification for relocating arbitrarily sized blocks of computer instructions included in a computer code to arbitrary locations, said system comprising:

an input module configured to receive blocks of instructions, said blocks of instructions being of an arbitrarily-selectable size;

a microprocessor configured to define in a specification how to relocate said blocks of instructions to arbitrary locations; and an output module configured to transmit the specification, wherein the specification is configured to determine the arbitrary locations to which the blocks of instructions will be moved based at least in part on a randomization function, wherein said microprocessor is further configured to determine the size of said blocks based at least in part on another randomization function, and to identify indirect branch targets among said blocks of instructions, wherein the specification includes rules for relocating all of the identified indirect branch targets to randomized locations, and rules for modifying a call instruction for an original address of at least one of the indirect branch targets so that the call instruction is directed to the randomized location for the at least one of the indirect branch targets, and wherein the relocation may occur according to the specification that defines how to perform the relocation, the relocated blocks of instructions may be re-relocated at any time, and the re-relocation may include only a portion of the blocks of instructions.

2. The system of claim 1, wherein said output module is a storage module, memory, network, or a display.

3. The system of claim 1, wherein said microprocessor is further configured to define the instruction execution sequence.

4. The system of claim 1, wherein said input module receives one or more files.

5. The system of claim 1, wherein said microprocessor is further configured to define in said specification rules for modifying call instructions and storing relocated return addresses.

6. The system of claim 4, wherein said microprocessor is further configured to define in said specification how to transform said one or more files to include in said one or more files the relocation of said blocks of instructions to arbitrary locations in memory.

7. The system of claim 1, wherein said microprocessor is further configured to define in said specification how to define in a second specification how to add, modify, and/or remove blocks of instructions.

8. The system of claim 4, wherein said microprocessor is further configured to encode said one or more files with said specification.

9. A system for computer security that defines a specification for relocating arbitrarily sized blocks of computer instructions included in a computer code to arbitrary locations, and relocates the arbitrarily sized blocks of instructions based on the specification, said system comprising:
an input module configured to receive blocks of instructions, said blocks of instructions being of an arbitrarily-selectable size;
a microprocessor configured to:
define in a specification how to relocate said blocks of instructions to arbitrary locations; and
relocate said blocks of instructions according to said specification; and
an output module configured to send said blocks of instructions to said arbitrary locations,
wherein the specification is configured to determine the arbitrary locations to which the blocks of instructions will be moved based at least in part on a randomization function,
wherein said microprocessor is further configured to determine the size of said blocks based at least in part on another randomization function, and to identify indirect branch targets among said blocks of instructions,
wherein the specification includes rules for relocating all of the identified indirect branch targets to randomized locations, and rules for modifying a call instruction for an original address of at least one of the indirect branch targets so that the call instruction is directed to the randomized location for the at least one of the indirect branch targets, and wherein the relocation may occur according to the specification that defines how to perform the relocation, the relocated blocks of instructions may be re-relocated at any time, and the re-relocation may include only a portion of the blocks of instructions.

10. The system of claim 9, further comprising a compiler, assembler, linker, or loader.

11. The system of claim 9, wherein said microprocessor is further configured to define in said specification how to add, modify, and/or remove said blocks of instructions.

12. The system of claim 9, wherein said microprocessor is further configured to define in said specification the locations of non-relocated instructions.

13. The system of claim 9, wherein said microprocessor is further configured to define the execution successors of each instruction in said blocks of instructions.

14. The system of claim 9, further comprising one or more files.

15. The system of claim 9, wherein said microprocessor is further configured to scan said blocks of instructions to identify instructions which should not be relocated.

16. The system of claim 9, wherein said microprocessor is further configured to rewrite exception handling tables to contain the locations of said indirect branch targets.

17. The system of claim 9, wherein said microprocessor is further configured to define in said specification rules for modifying call instructions and storing relocated return addresses.

18. The system of claim 14, wherein said microprocessor is further configured to define in said specification how to transform said one or more files to include in said one or more files the relocation of said blocks of instructions to arbitrary locations.

19. The system of claim 14, wherein said microprocessor is further configured to define in said specification how to re-relocate said blocks of instructions at any time.

20. The system of claim 9, wherein said microprocessor is further configured to define in said specification how to re-relocate a portion of said blocks of instructions at any time.

21. The system of claim 9, further comprising a virtual machine.

22. The system of claim 21, wherein said virtual machine is a per-process virtual machine.

23. The system of claim 21, wherein said virtual machine prevents revealing of said relocated instruction locations.

24. The system of claim 21, wherein said virtual machine is a system-level virtual machine.

25. The system of claim 9, wherein said microprocessor is further configured with an interpreter for processing said blocks of instructions.

26. The system of claim 9, wherein said microprocessor is further configured with an execution-time compiler or optimizer for processing said blocks of instructions.

27. The system of claim 9, wherein said microprocessor is further configured with a simulator for processing said blocks of instructions.

28. The system of claim 9, wherein said microprocessor is further configured with an emulator for processing said blocks of instructions.

29. The system of claim 9, wherein said microprocessor is further configured with a binary rewriter for processing said blocks of instructions.

30. The system of claim 9, wherein said microprocessor can operate in parallel.

\* \* \* \* \*